US010708461B2

(12) United States Patent
Ogawa et al.

(10) Patent No.: US 10,708,461 B2
(45) Date of Patent: Jul. 7, 2020

(54) INFORMATION PROCESSING SYSTEM, INFORMATION PROCESSING APPARATUS, AND METHOD OF GENERATING AN APPLICATION SETTING SCREEN GENERATED BASED ON APPLICATION SETTING SCREEN METADATA

(71) Applicants: Minami Ogawa, Tokyo (JP); Kai Kodama, Kanagawa (JP)

(72) Inventors: Minami Ogawa, Tokyo (JP); Kai Kodama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 152 days.

(21) Appl. No.: 15/492,172

(22) Filed: Apr. 20, 2017

(65) Prior Publication Data
US 2017/0331969 A1    Nov. 16, 2017

(30) Foreign Application Priority Data

May 12, 2016  (JP) ................................ 2016-095862
Nov. 7, 2016  (JP) ................................ 2016-217098

(51) Int. Cl.
H04N 1/00      (2006.01)
G06F 8/38      (2018.01)
G06F 9/451     (2018.01)

(52) U.S. Cl.
CPC ........... H04N 1/00938 (2013.01); G06F 8/38 (2013.01); G06F 9/454 (2018.02); H04N 1/0097 (2013.01);
(Continued)

(58) Field of Classification Search
None
See application file for complete search history.

(56) References Cited

U.S. PATENT DOCUMENTS 7,610,548 B1 * 10/2009 Brinkman ............. G06F 40/174
                                                715/221
2008/0209449 A1 *  8/2008 Maehira .............. G06F 9/44505
                                                719/321
(Continued)

FOREIGN PATENT DOCUMENTS

JP    2006-134043    5/2006
JP    2006-352845    12/2006
JP    2014-048756    3/2014

OTHER PUBLICATIONS

Edume, P., "php—How to make a Multilanguage website—Stack Overflow," https://stackoverflow.com/questions/2487171/how-to-make-a-multilanguage-website, May 21, 2015.
(Continued)

Primary Examiner — Mohammad H Ghayour
Assistant Examiner — Pawan Dhingra
(74) Attorney, Agent, or Firm — Harness, Dickey & Pierce, P.L.C.

(57) ABSTRACT

An information processing system includes an information processing apparatus that provides an electronic apparatus with a service by way of a web application. The system includes a memory and circuit. The memory is configured to store information relating to a setting item of the web application, and store a setting value to be set to the setting item. The circuitry is configured to generate a setting screen based on the information relating to the setting item and the setting value, and update the setting value stored in the memory based on an instruction for configuring settings relating to an operation screen of the web application that is displayed at the electronic apparatus, the instruction being accepted through the setting screen being displayed to the terminal apparatus.

20 Claims, 45 Drawing Sheets

(52) U.S. Cl.
CPC ..... *H04N 1/00464* (2013.01); *H04N 1/00503* (2013.01)

(56) References Cited

U.S. PATENT DOCUMENTS

| | | | |
|---|---|---|---|
| 2012/0062926 A1* | 3/2012 | Takada ................. | G06F 3/1205 358/1.13 |
| 2012/0120437 A1* | 5/2012 | Nanaumi ............. | G06F 3/1288 358/1.15 |
| 2013/0182282 A1* | 7/2013 | Nakayama ......... | H04N 1/00464 358/1.14 |

OTHER PUBLICATIONS

Moore, A., "User Input Validation in ASP.Net." https''//msdn.microsfot.com/en-us/library/ms972961.aspx, Mar. 1, 2002.
Extended European Search Report dated Apr. 9, 2017.

* cited by examiner

FIG. 5

| APP ID | APP SETTING SCREEN METADATA |
|---|---|
| app1 | (JSON) |
| app2 | (JSON) |
| app3 | (JSON) |

FIG. 6

| APP SETTING ID | APP SETTING | APP ID |
|---|---|---|
| 879QOWI0 | (JSON) | app1 |
| 0RXU982W | (JSON) | app1 |
| 664OZJ8M | (JSON) | app2 |

```
{
  "sections": [
    {
      "id": "filename",
      "label": "FILE NAME SETTINGS",
      "fields": [
        {
          "id": "default_filename",
          "label": "DEFAULT FILE NAME",
          "type": "text",
          "required": true
        },
        {
          "id": "date_format",
          "label": "DATE FORMAT",
          "type": "dropdown",
          "items": [
            {
              "value": "yyyymmdd",
              "label": "YYYYMMDD"
            },
            {
              "value": "yyyy-mm-dd",
              "label": "YYYY-MM-DD"
            }
          ],
          "required": true,
          "maxlength": 100
        }
      ]
```

FIG. 7B

```
    },
    {
      "id": "destination",
      "label": " DESTINATION SETTINGS",
      "fields": [
        {
          "id": "cloud_service",
          "label": "CLOUND SERVICE",
          "type": "dropdown",
          "items": [
            {
              "value": "◯◯◯",
              "label": "◯◯◯ Drive"
            },
            {
              "value": "△△△",
              "label": "△△△ Online"
            }
          ]
        }
      ]
    }
  ]
}
```

FIG. 8A

| id | CHARACTER STRING FOR IDENTIFYING "SECTION" |
|---|---|
| label | TITLE OF SECTION DISPLAYED ON SCREEN |
| fields | COLLECTION OF MULTIPLE FIELDS |

FIG. 8B

| id | CHARACTER STRING FOR IDENTIFYING "FILED" |
|---|---|
| label | LABEL OF SETTING ITEM DISPLAYED ON SCREEN |
| type | TYPES OF SETTING ITEMS<br>e.g.,<br>– text: TEXT OF ONE LINE<br>– dropdown: DROP-DOWN LIST<br>– multiline text: TEXT OF MULTIPLE LINES<br>– radio: RADIO BUTTON<br>– checkbox: CHECK BOX |
| items | SELECTABLE ITEMS<br>USED WHEN "type" IS ANY ONE OF "dropdown", "radio", AND "checkbox"<br>– value: VALUES OF SELECTABLE ITEMS. SELECTED VALUE IS SET TO APP SETTING<br>– label: LABELS OF SELECTED ITEMS DISPLAYED ON SCREEN |
| required<br>maxlength<br>⋮ | } APPROPRIATENESS CHECK INFORMATION |

FIG. 9

```
{
  "filename": {
    "default_filename": "(QUOTE)",
    "date_format": "yyyy-mm-dd"
  },
  "destination": {
    "cloud_service": "XXX"
  }
}
```

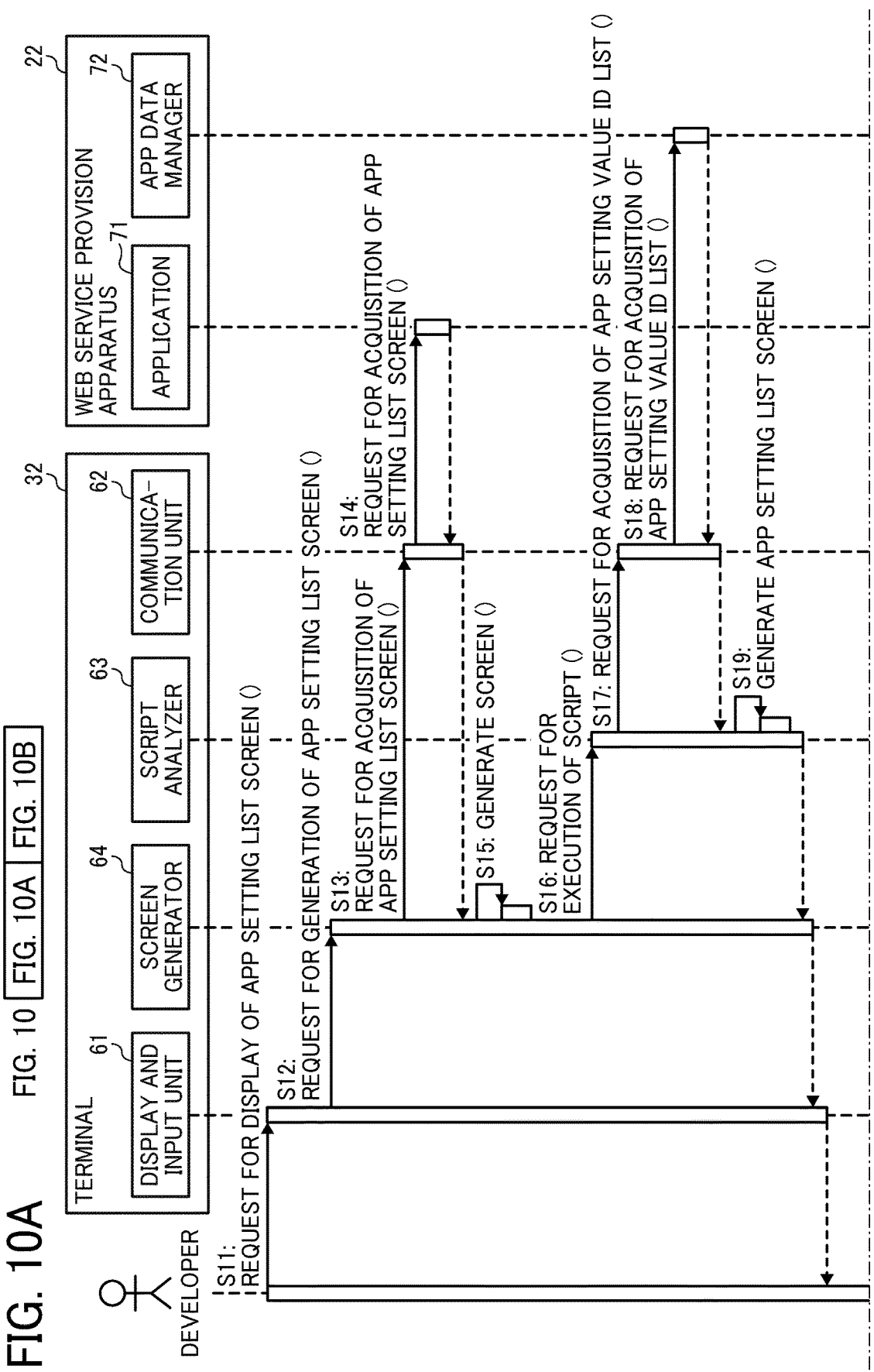

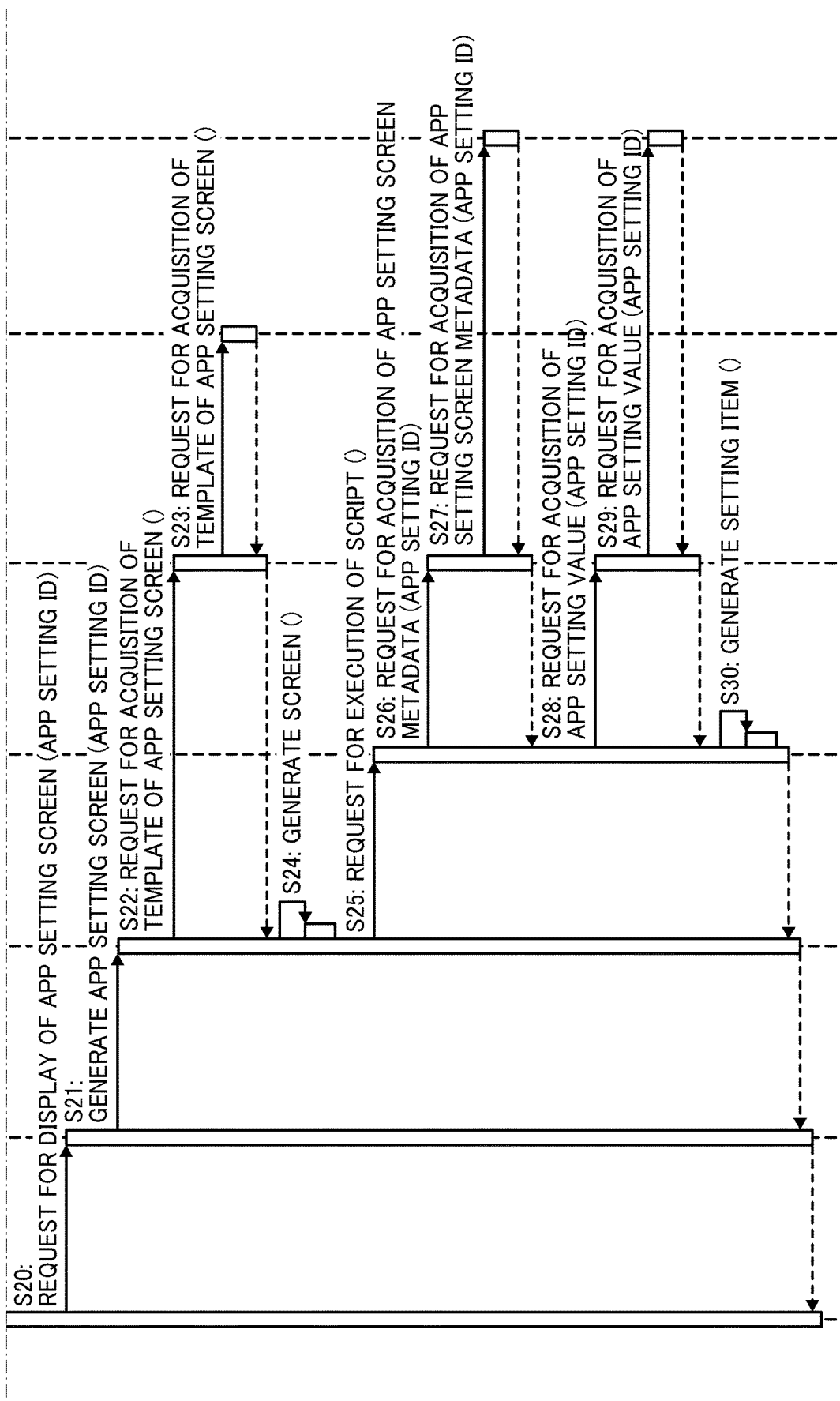

```
{
  "results": [
    {
      "appdata_id": "879QOWI0"
    },
    {
      "appdata_id": "0RXU982W"
    },
    {
      "appdata_id": "664OZJ8M"
    }
  ]
}
```

FIG. 14

```
<!DOCTYPE html>
<html>
<head>
    <title>APP SETTINGS</title>
</head>
<body>

<!-- area displaying a setting item>
    <div></div>

<button>SAVE</button>

</body>
</html>
```

FIG. 15

| TYPE OF SETTING ITEMS (type) | HTML |
|---|---|
| text | `<input type="text">` |
| dropdown | `<select>`<br>  `<option></option>`<br>`</select>` |

FILE NAME SETTINGS

DEFAULT FILE NAME
QUOTE

DATE FORMAT
YYYY-MM-DD ▼

DESTINATION SETTINGS

CLOUD SERVICE
XXX Drive ▼

SAVE

| FIG. 20A |
|---|
| FIG. 20B |
| FIG. 20C |

```
{
  "sections": [
    {
      "id": "common",
      "label": "COMMON SETTINGS",
      "fields": [
        {
          "id": "mailSubject",
          "label": "MAIL SUBJECT",
          "type": "text",
          "required": true
        },
        {
```

FIG. 20B

```
"id": "scanColor",
"label": "MAIL TEXT",
"type": "dropdown",
"default": "auto_color",
"items": [
    {
        "value": "auto_color",
        "label": "SCAN COLOR MODE",
    },
    {
```

FIG. 20C

```
"value": "auto_color",
"label": "AUTOMATIC COLOR SELECTION",
},
{
"value": "monochrome_text_lineart",
"label": "MONOCHROME (BINARY), TEXT AND DIAGRAM",
},
{
"value": "grayscale",
"label": "GRAY SCALE",
},
{
"value": "color_text_photo",
"label": "FULL-COLOR, TEXT AND PHOTOGRAPH",
},
```

FIG. 21

```
{
  "sections": [
    {
      "id": "common",
      "label": " COMMON SETTINGS",
      "fields": [
        {
          "id": "rootFolderId",
          "label": " DEFAULT HOLDER ID",
          "type": "text",
          "required": true
        },
        {
          "id": "printColor",
          "label": " PRINT COLOR MODE",
          "type": "dropdown",
          "items": [
            {
              "value": "monochrome",
              "label": " MONOCHROME",
            },
            {
              "value": "color",
              "label": " COLOR",
            }
          ]
        },
        {
          "id": "disabledPrintColor",
          "label": " DISABLE CHANGE OF PRINT COLOR MODE",
          "type": "boolean"
        }
      ]
    }
  ]
}
```

FIG. 22

COMMON SETTINGS

| | |
|---|---|
| MAIL SUBJECT | %FILENAME- XXX Cloud Service |
| MAIL TEXT | THIS IS A MAIL SENT FROM THE XXX CLOUD SERVICE. |
| SCAN COLOR MODE | AUTOMATIC COLOR SELECTION ▼ |

[SAVE]

FIG. 23

COMMON SETTINGS

| | |
|---|---|
| DEFAULT HOLDER ID | 0B7Dlmrr |
| PRINT COLOR MODE | MONOCHROME ▼ |

☐ DISABLE CHANGE OF PRINT COLOR MODE

[SAVE]

FIG. 24

| APP SETTING ID | APP SETTING SCREEN METADATA | MULTILINGUAL RESOURCE DATA |
|---|---|---|
| app1 | (JSON) | (JSON) |
| app2 | (JSON) | (JSON) |
| app3 | (JSON) | (JSON) |

FIG. 25

```
{
  "en": {
    "filename": "Filename Settings",
    "default_filename": "Default Filename",
    "date_format": "Date Format",
    "destination": "Destination Settings",
    "cloud_service": "Cloud Service"
  },
  "ja": {
    "filename": "FILE NAME SETTINGS",
    "default_filename": "DEFAULT FILE NAME",
    "date_format": "DATE FORMAT",
    "destination": "DESTINATION SETTINGS",
    "cloud_service": "CLOUD SERVICE",
  }
}
```

```
{
  "sections": [
    {
      "id": "filename",
      "label": "{{ filename }}",
      "fields": [
        {
          "id": "default_filename",
          "label": "{{ default_filename }}",
          "type": "text",
          "required": true
        },
        {
          "id": "date_format",
          "label": "{{ date_format }}",
          "type": "dropdown",
          "items": [
            {
              "value": "yyyymmdd",
              "label": "YYYYMMDD"
            },
            {
              "value": "yyyy-mm-dd",
              "label": "YYYY-MM-DD"
            }
          ],
          "required": true,
          "maxlength": 100
```

FIG. 26B

```
        }
      ]
    },
    {
      "id": "destination",
      "label": "{{ destination }}",
      "fields": [
        {
          "id": "cloud_service",
          "label": "{{ cloud_service }}",
          "type": "dropdown",
          "items": [
            {
              "value": "○○○",
              "label": "○○○ Drive"
            },
            {
              "value": "△△△",
              "label": "△△△ Online"
            }
          ]
        }
      ]
    }
  ]
}
```

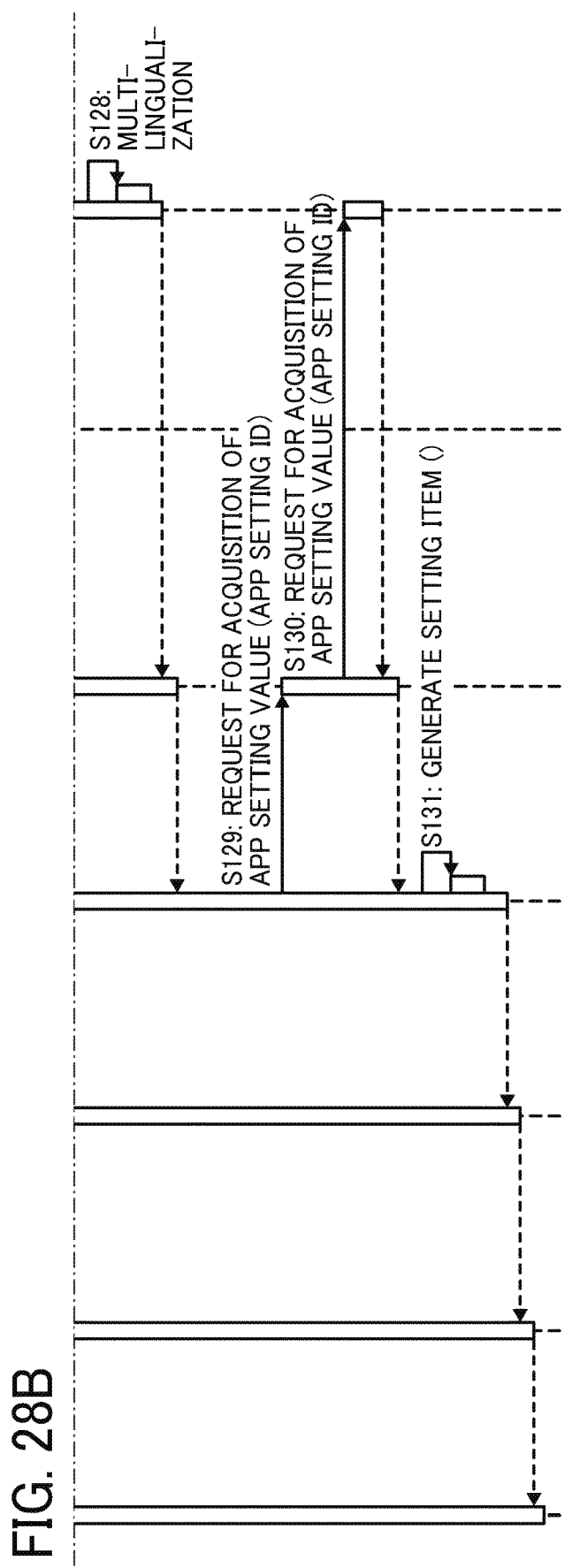

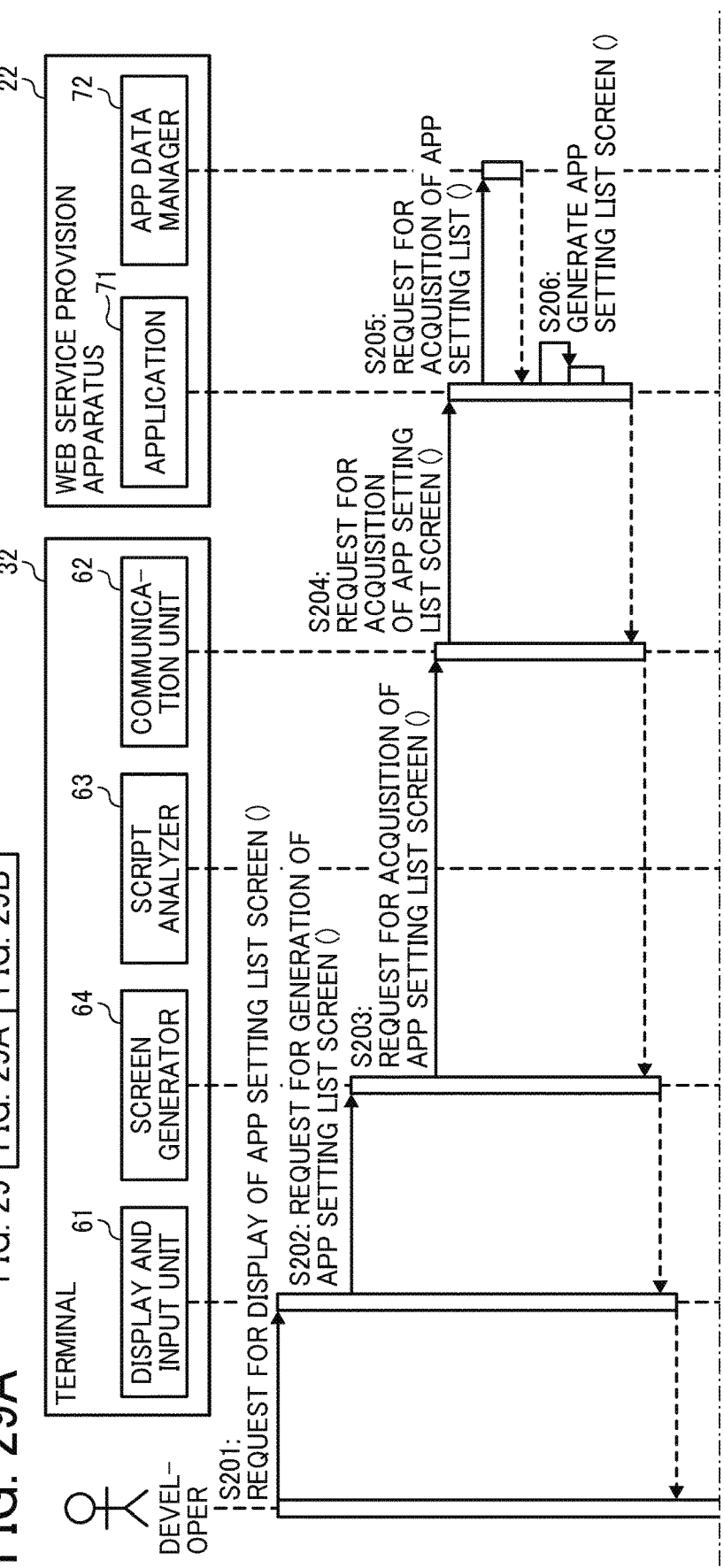

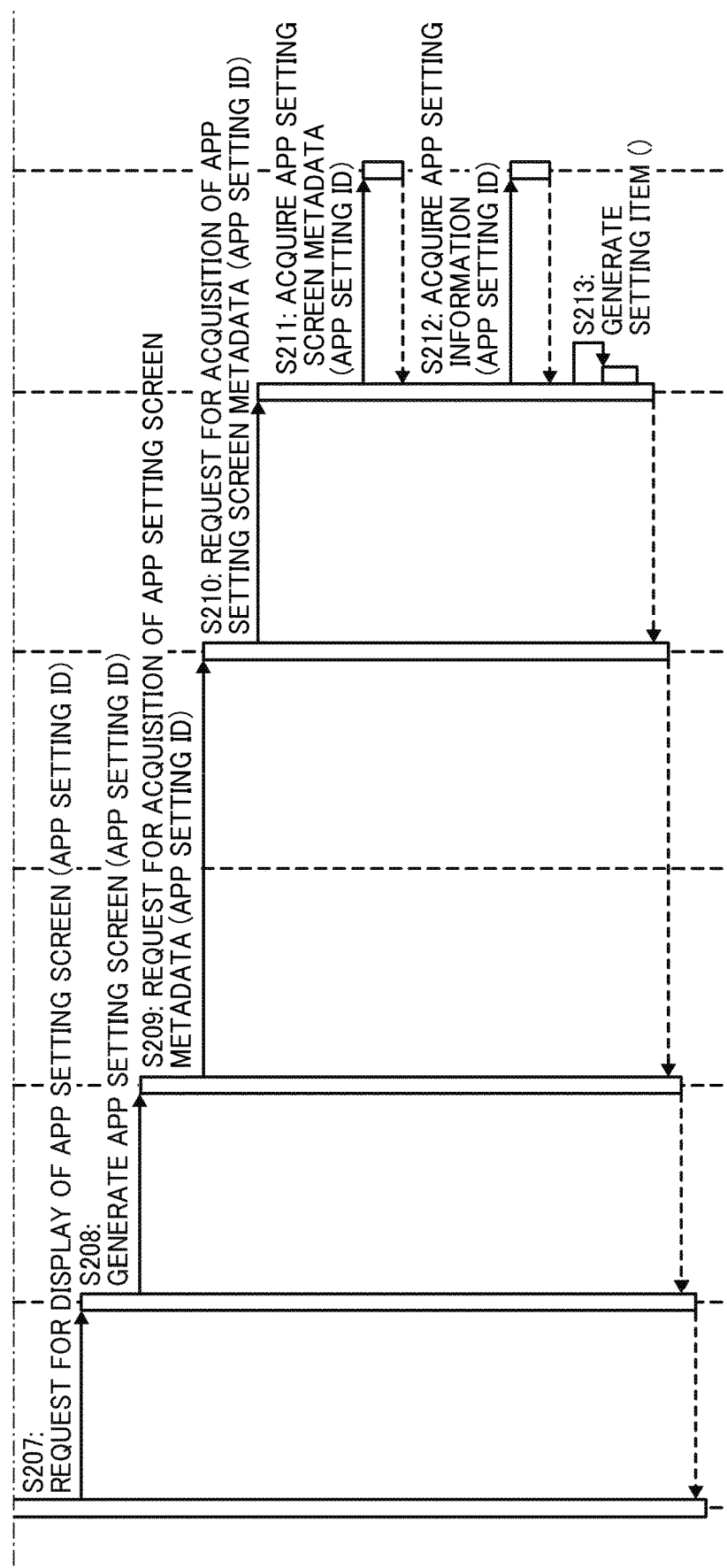

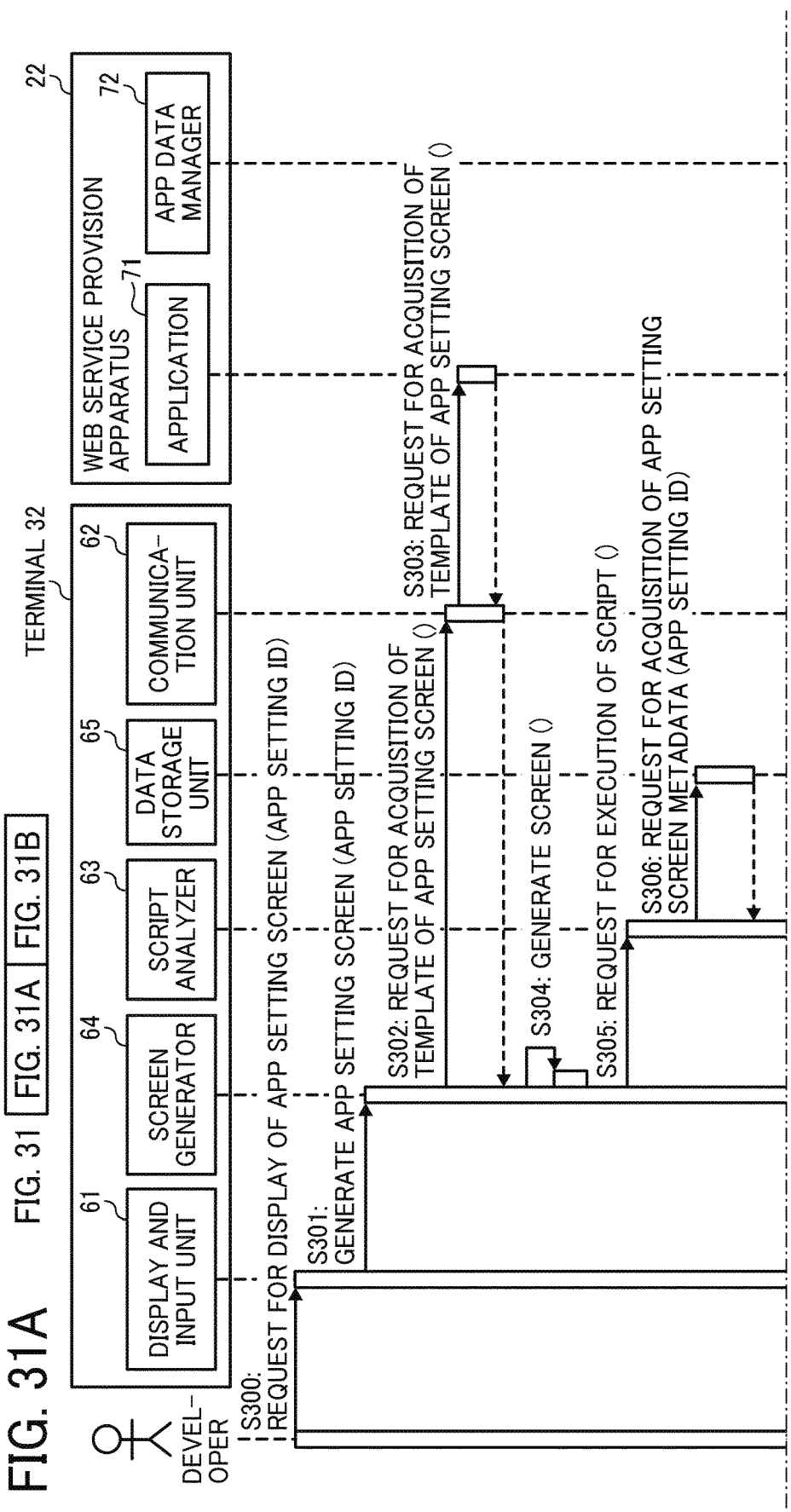
FIG. 31A   FIG. 31   FIG. 31A | FIG. 31B

FIG. 32

```
{
  "sections": [
    {
      "id": "userSettings",
      "label": "USER SETTINGS",
      "fields": [
        {
          "id": "userName",
          "label": "USER NAME",
          "type": "text",
          "required": true
        }
      ]
    }
  ]
}
```

FIG. 33

[APPROPRIATE CASE]

USER NAME | XXX Taroh |

[INAPPROPRIATE CASE]

USER NAME | |
USER NAME IS NOT ENTERED

FIG. 34

```
{
  "sections": [
    {
      "id": "printSettings",
      "label": "PRINT SETTINGS",
      "fields": [
        {
          "id": "copies",
          "label": "NUMBER OF COPIES",
          "type": "text",
          "number": true
        }
      ]
    }
  ]
}
```

FIG. 35

```
{
  "sections": [
    {
      "id": "printSettings",
      "label": "PRINT SETTINGS",
      "fields": [
        {
          "id": "copies",
          "label": "NUMBER OF COPIES",
          "type": "text",
          "number": true,
          "minvalue": 1
        }
      ]
    }
  ]
}
```

FIG. 36

```
{
  "sections": [
    {
      "id": "fileName",
      "label": "FILE NAME SETTINGS",
      "fields": [
        {
          "id": "defaultFileName ",
          "label": "DEFAULT FILE NAME",
          "type": "text",
          "maxlength": 10
        }
      ]
    }
  ]
}
```

FIG. 37

[APPROPRIATE CASE]

DEFAULT FILE NAME: CONTRACT

[INAPPROPRIATE CASE]

DEFAULT FILE NAME: CONTRACT_AAAAAAAAAA

DEFAULT FILE NAME SHOULD BE LESS THAN 10 CHARACTERS IN LENGTH OR LESS

FIG. 38

```
{
  "sections": [
    {
      "id": "accountSettings",
      "label": "ACCOUNT SETTINGS",
      "fields": [
        {
          "id": "password",
          "label": "PASSWORD",
          "type": "text"
        },
        {
          "id": "password_confirmation",
          "label": "CONFIRMATION OF PASSWORD",
          "type": "text",
          "correlation": [
            {
              "target": "password",
              "equals": true,
            }
          ]
        }
      ]
    }
  ]
}
```

FIG. 39

```
{
  "sections": [
    {
      "id": "userSettings",
      "label": "{{ userSettings }}",
      "fields": [
        {
          "id": "userName",
          "label": "{{ userName }}",
          "type": "text",
          "required": "{{ username_required }}",
        }
      ]
    }
  ]
}
```

FIG. 40

```
{
  "sections": [
    {
      "id": "userSettings",
      "label": "{{ userSettings }}",
      "fields": [
        {
          "id": "userName",
          "label": "{{ userName }}",
          "type": "text",
          "required": true,
          "required_invalid_message": "{{ userName_is_required }}",
        }
      ]
    }
  ]
}
```

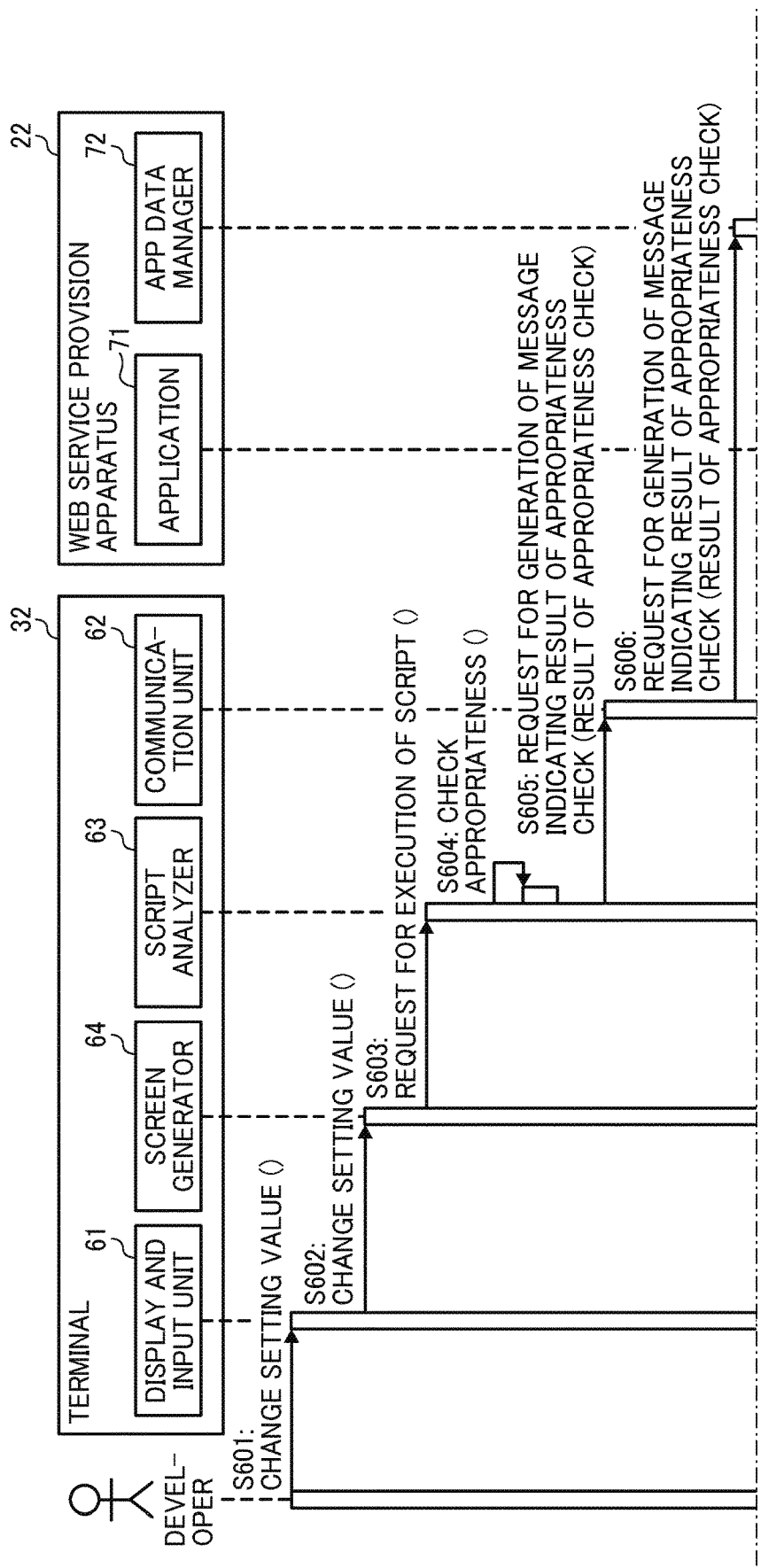

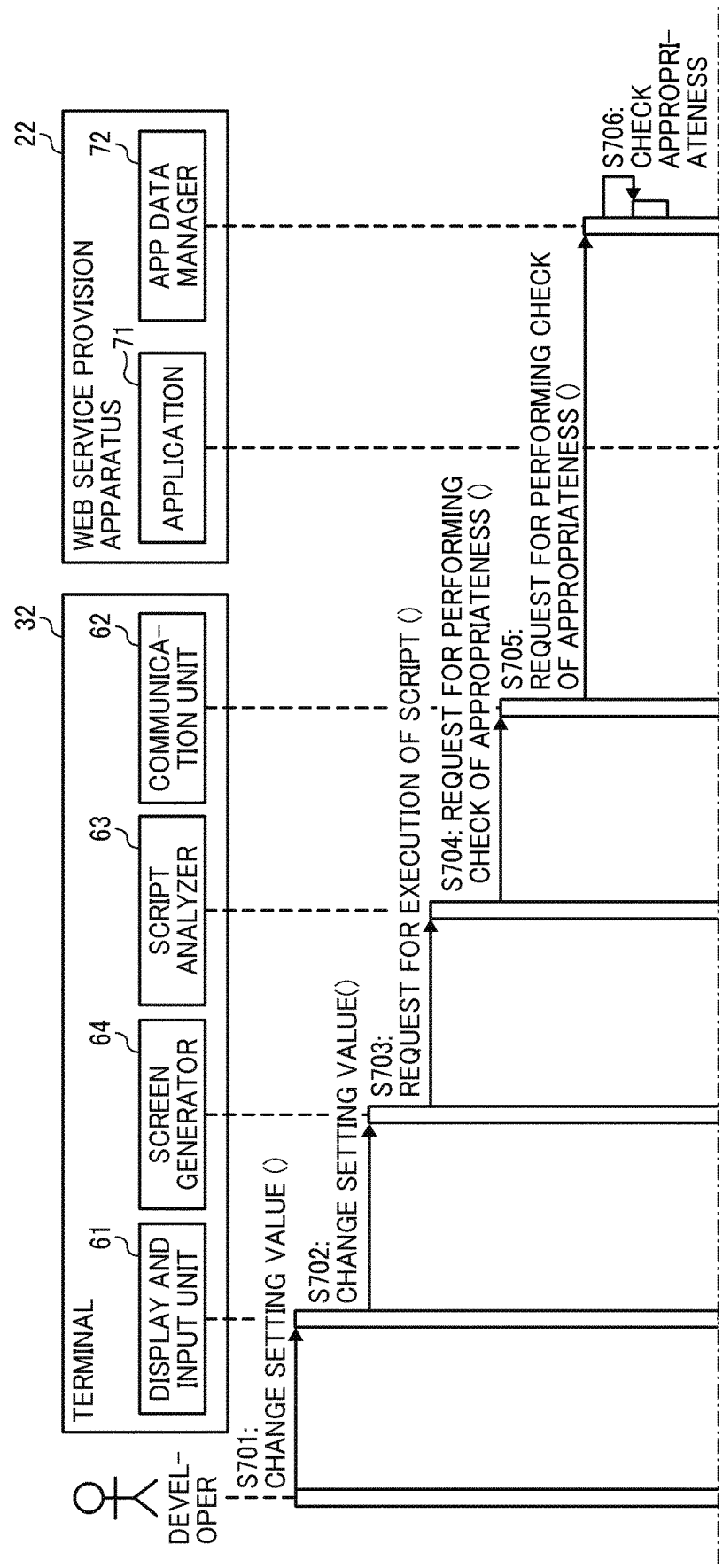

INFORMATION PROCESSING SYSTEM, INFORMATION PROCESSING APPARATUS, AND METHOD OF GENERATING AN APPLICATION SETTING SCREEN GENERATED BASED ON APPLICATION SETTING SCREEN METADATA

CROSS-REFERENCE TO RELATED APPLICATIONS

This patent application is based on and claims priority pursuant to 35 U.S.C. § 119(a) to Japanese Patent Application Nos. 2016-095862, filed on May 12, 2016 and 2016-217098, filed on Nov. 7, 2016 in the Japan Patent Office, the entire disclosures of which are hereby incorporated by reference herein.

BACKGROUND

Technical Field

The present disclosure relates to an information processing system, an information processing apparatus, and a method of generating screen.

Description of the Related Art

A configuration is known in which application software that operates on an image forming apparatus is developed as a web application software (referred to as a "web application" hereinafter).

For example, a technique is known in which an image forming apparatus displays a screen on a control panel of the image forming apparatus based on Hyper Text Markup Language (HTML) data provided by application software of an external server. This technique enables the development or management of application software at the external server, thereby improving efficiency of screen development.

Setting items and setting values that are set on an application screen sometimes vary depending on types of the web application that operates on the image forming apparatus. For this reason, developers of web applications have to develop, in addition to the web applications themselves, application setting screens for configuring setting values of setting items of the web applications. This degrades efficiency in developing web applications.

SUMMARY

An information processing system includes an information processing apparatus that provides an electronic apparatus with a service by way of a web application. The system includes a memory and circuit. The memory is configured to store information relating to a setting item of the web application, and store a setting value to be set to the setting item. The circuitry is configured to generate a setting screen based on the information relating to the setting item and the setting value, and update the setting value stored in the memory based on an instruction for configuring settings relating to an operation screen of the web application that is displayed at the electronic apparatus, the instruction being accepted through the setting screen being displayed to the terminal apparatus.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is an illustration of an example configuration of application information according to an embodiment of the present disclosure;

FIG. 6 is an illustration of an example configuration of application setting value information according to an embodiment of the present disclosure;

FIGS. 7A and 7B are an illustration of an example configuration of application setting screen metadata according to an embodiment of the present disclosure;

FIG. 8A is an illustration for explaining "section" according to an embodiment of the present disclosure;

FIG. 8B is an illustration for explaining "field" according to an embodiment of the present disclosure;

FIG. 9 is an illustration of an example configuration of an application setting value according to an embodiment of the present disclosure;

FIGS. 10A, 10B and FIG. 11 are a sequence diagram illustrating an example operation of setting an application according to an embodiment of the present disclosure;

FIG. 14 is an illustration of an example configuration of an application setting screen template according to an embodiment of the present disclosure;

FIG. 15 is an illustration of an example configuration of mapping information associating a type of setting item with HTML data according to an embodiment of the present disclosure;

FIG. 16 is a conceptual drawing illustrating an example of an application setting screen according to an embodiment of the present disclosure;

FIGS. 20A to 20C are an illustration of an example configuration of application setting screen metadata for a Scan to Email service according to an embodiment of the present disclosure;

FIG. 21 is an illustration of an example configuration of application setting screen metadata for a cloud printing service according to an embodiment of the present disclosure;

FIG. 22 is a conceptual drawing illustrating an example of an application setting screen for the Scan to Email service according to an embodiment of the present disclosure;

FIG. 23 is a conceptual drawing illustrating an example of an application setting screen for the cloud printing service according to an embodiment of the present disclosure;

FIG. 24 is an illustration of an example configuration of application information that supports multilingualization according to an embodiment of the present disclosure;

FIG. 25 is an illustration of an example configuration of multilingual resource data according to an embodiment of the present disclosure;

FIGS. 26A and 26B are an illustration of an example configuration of application setting screen metadata that supports multilingualization according to an embodiment of the present disclosure;

FIGS. 28A and 28B are a sequence diagram illustrating an example operation of setting an application performed in a case in which multilingualization is performed according to an embodiment of the present disclosure;

FIGS. 29A and 29B are a sequence diagram illustrating still another example operation of setting an application according to an embodiment of the present disclosure;

FIGS. 31A and 31B are a sequence diagram illustrating still another example operation of setting an application according to an embodiment of the present disclosure;

FIG. 32 is an illustration of an example configuration of application setting screen metadata based on which an application setting screen including a text box that requires input is generated according to an embodiment of the present disclosure;

FIG. 33 is a conceptual drawing illustrating an example of the application screen including a text box that requires input according to an embodiment of the present disclosure;

FIG. 34 is an illustration of an example configuration of application setting screen metadata based on which an application setting screen including a text box that only accepts integers according to an embodiment of the present disclosure;

FIG. 35 is an illustration of an example configuration of application setting screen metadata based on which an application setting screen including a text box that only accepts a numerical value greater than or equal to 1 according to an embodiment of the present disclosure;

FIG. 36 is an illustration of an example configuration of application setting screen metadata based on which an application setting screen including a text box that only accepts a character string of 10 characters or less according to an embodiment of the present disclosure;

FIG. 37 is a conceptual drawing illustrating an example of the application screen including the text box that only accepts a character string of 10 characters or less according to an embodiment of the present disclosure;

FIG. 38 is an illustration of an example configuration of application setting screen metadata based on which an application setting screen including a first text box and a second text box that only accepts the same value as the one that is entered in the first text box according to an embodiment of the present disclosure;

FIG. 39 is an illustration of an example configuration of application setting screen metadata based on which an application setting screen including a text box that requires input in an English-language environment but does not requires input in an Japanese-language environment according to an embodiment of the present disclosure;

FIG. 40 is an illustration of an example configuration of the application setting screen metadata that supports multilingualization of a message indicating a result of appropriateness check according to an embodiment of the present disclosure;

FIGS. 42A and 42B are a sequence diagram illustrating an example operation of setting an application performed in a case in which the Web service provision apparatus generates a message indicating a result of check of appropriateness of an application setting value according to an embodiment of the present disclosure; and FIGS. 43A and 43B are a sequence diagram illustrating an example operation of setting an application performed in a case in which the Web service provision apparatus checks appropriateness of an application setting value and generates a message indicating a result of check of appropriateness of the application setting value according to an embodiment of the present disclosure.

Figure 1:
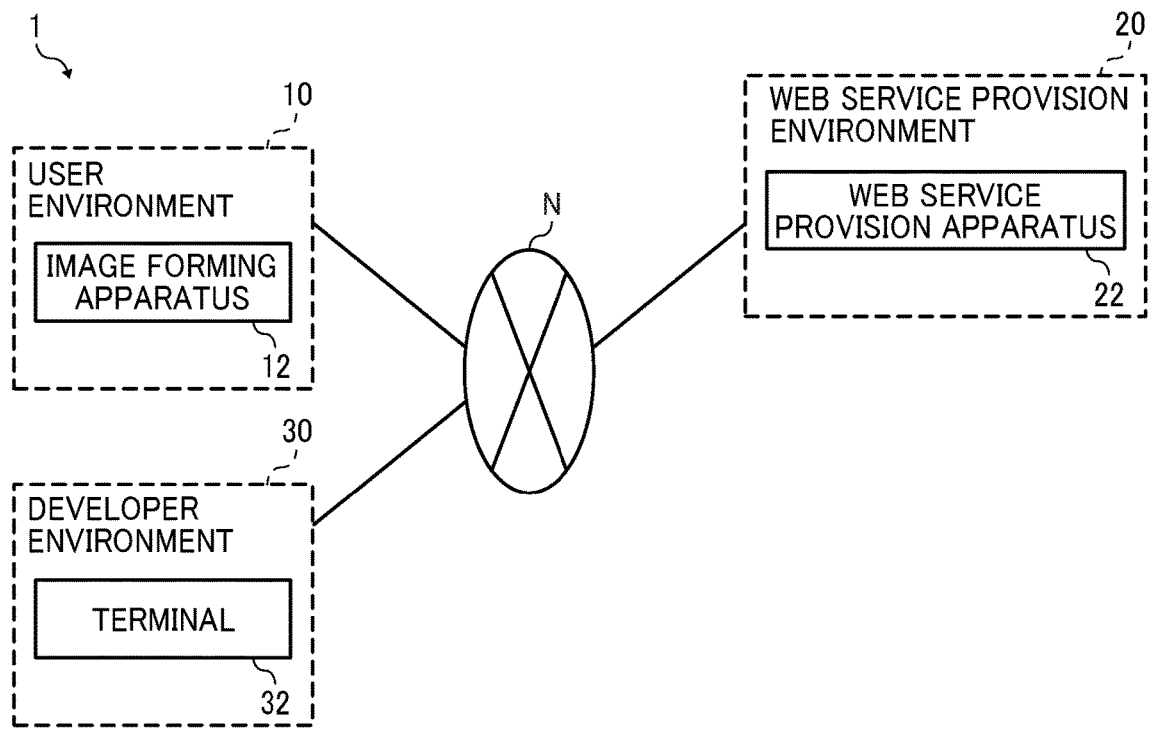
FIG. 1 a schematic view illustrating an example configuration of an information processing system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of several embodiments of the present disclosure.

First Embodiment

FIG. 1 is a schematic view illustrating an example configuration of an information processing system 1 according to a first embodiment. As illustrated in FIG. 1, the information processing system 1 includes a user environment 10, a Web service provision environment 20, and a developer environment 30, which are connected to one another via a network N.

The user environment 10 is a system of an organization such as a company that uses an image forming apparatus 12. The user environment 10 includes one or more image forming apparatus 12 connected to the network N. The image forming apparatus 12 is an example of an electronic apparatus.

The electronic apparatus according to the first embodiment could be any suitable apparatus, other than the image forming apparatus 12, such as a multifunction peripheral, a scanner, a printer, a facsimile, a projector, an electronic white board, provided that a web application could operate on the apparatus. The image forming apparatus 12 performs image formation processing such as scanning, printing, and facsimile communication.

A terminal 32 is an apparatus operated by a developer in the developer environment 30. Examples of the terminal 32 include a personal computer (PC), a tablet, a smartphone, a mobile phone, and a personal digital assistance (PDA).

The Web service provision environment 20 is a system of an organization such as a service company that provides web services such as a cloud scanning service or cloud printing service via the network N. The Web service provision environment includes a Web service provision apparatus 22. Although in the first embodiment, a description is given of an example of a web service, the embodiment may be applied to any other suitable service such as a service provided by an application service provider (ASP) and a cloud service, provided that the service is provided via the network N.

The Web service provision apparatus 22 provides the image forming apparatus 12 with a web service such as a cloud scanning service or a cloud printing service via the network N. For example, the cloud scanning service is a service that stores image data scanned by the image forming apparatus 12 in the user environment 10 in a preset storage destination (storage area) such as an online storage service. In addition, the cloud printing service is a service that enables the image forming apparatus 12 in the user environment 10 to perform printing based on print data stored in a preset storage destination such as an online storage service.

The network N of the information processing system 1 illustrated in FIG. 1 may be either wired network or wireless network. The system configuration illustrated in FIG. 1 is just an example of the information processing system 1, and for example, functions performed by the Web service provision apparatus 22 in the Web service provision environment 20 may be distributed over a plurality of computers.

Figure 2:
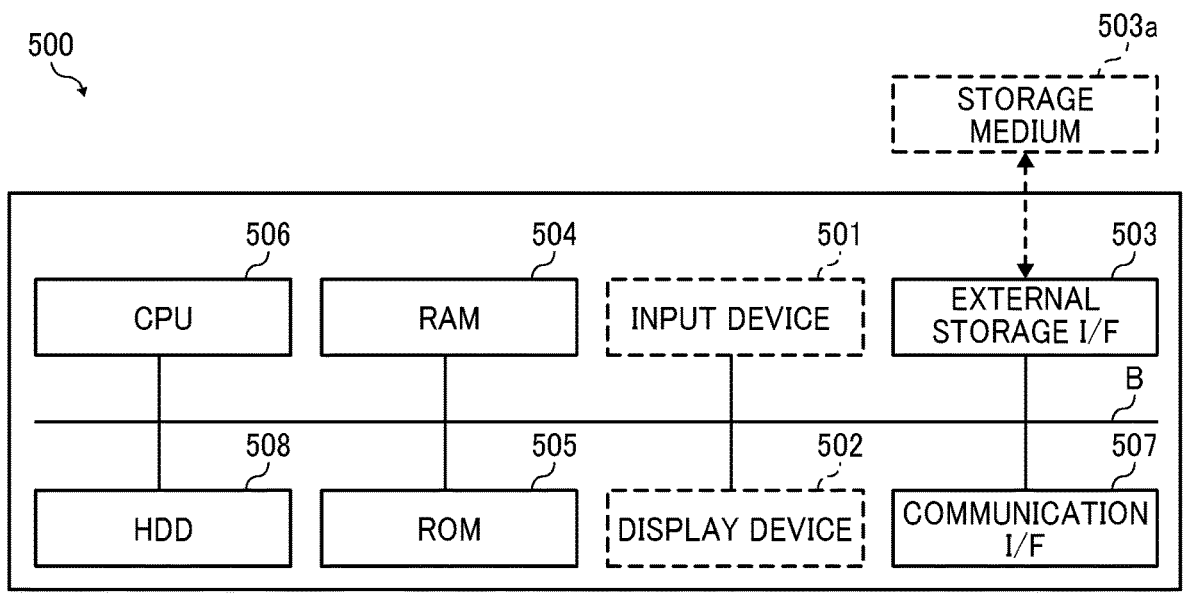
FIG. 2 is a block diagram illustrating an example hardware configuration of a computer according to an embodiment of the present disclosure.

The Web service provision apparatus 22 and the terminal 32 are each implemented by a computer 500 having a hardware configuration illustrated in FIG. 2. FIG. 2 is a block diagram illustrating an example hardware configuration of a computer 500 according to the first embodiment.

As illustrated in FIG. 2, the computer 500 includes an input device 501, a display device 502, an external interface 503, a random access memory (RAM) 504, a read only memory (ROM) 505, a central processing unit (CPU) 506, a communication interface 507, and a hard disc drive (HDD) 508, which are connected to one another via a bus B. It should be noted that the input device 501 and the display device 502 are not necessarily constantly connected to the bus B. In other words, the input device 501 and the display device 502 could be connected to the bus B as necessary when used.

The input device 501 includes a keyboard, a mouse, and/or a touch panel enabling a user to input various operation instruction. The display device 502 includes a display on which results of processing by the computer 500 are displayed.

The communication interface 507 is an interface device to connect the computer 500 to various networks. The computer 500 performs data communication via the communication interface 507.

The HDD 508 is an example of a nonvolatile storage device that stores programs or data therein. Examples of the programs or data stored in the HDD 508 include an operating system (OS) for controlling an entire operation of the computer 500 and application software providing various functions on the OS. The application software may be referred to as an "application" hereinafter, in order to simplify description. The computer 500 may include, instead of the HDD 508, a drive device such as a solid state drive (SSD) that uses a flash memory as a storage medium.

The external interface 503 is an interface device with an external device. Examples of the external device include a storage medium 503a. The external interface 503 enables the computer 500 to read or write data from or to the storage medium 503a. Examples of the storage medium 503a include a flexible disc, a compact disc (CD), a digital versatile disc (DVD), a SD memory card, and a universal serial bus (USB) memory.

The ROM 505 is an example of a nonvolatile semiconductor memory, which holds programs or data even after the computer 500 is turned off as the power is not supplied. The ROM 505 stores programs and data such as a basic input output system (BIOS), which is executed when the computer 500 starts up, OS settings, and network settings. The RAM 504 is a volatile semiconductor memory, which holds programs or data temporarily.

The CPU 506 reads programs or data from a storage device such as the ROM 505 and the HDD 508 onto the RAM 504, and executes processing to implement the entire control of the computer 500 or functions of the computer 500.

The Web service provision apparatus 22 and the terminal 32 implement various processing as described later with the hardware configuration of the computer 500 as illustrated in FIG. 2.

Figure 3:
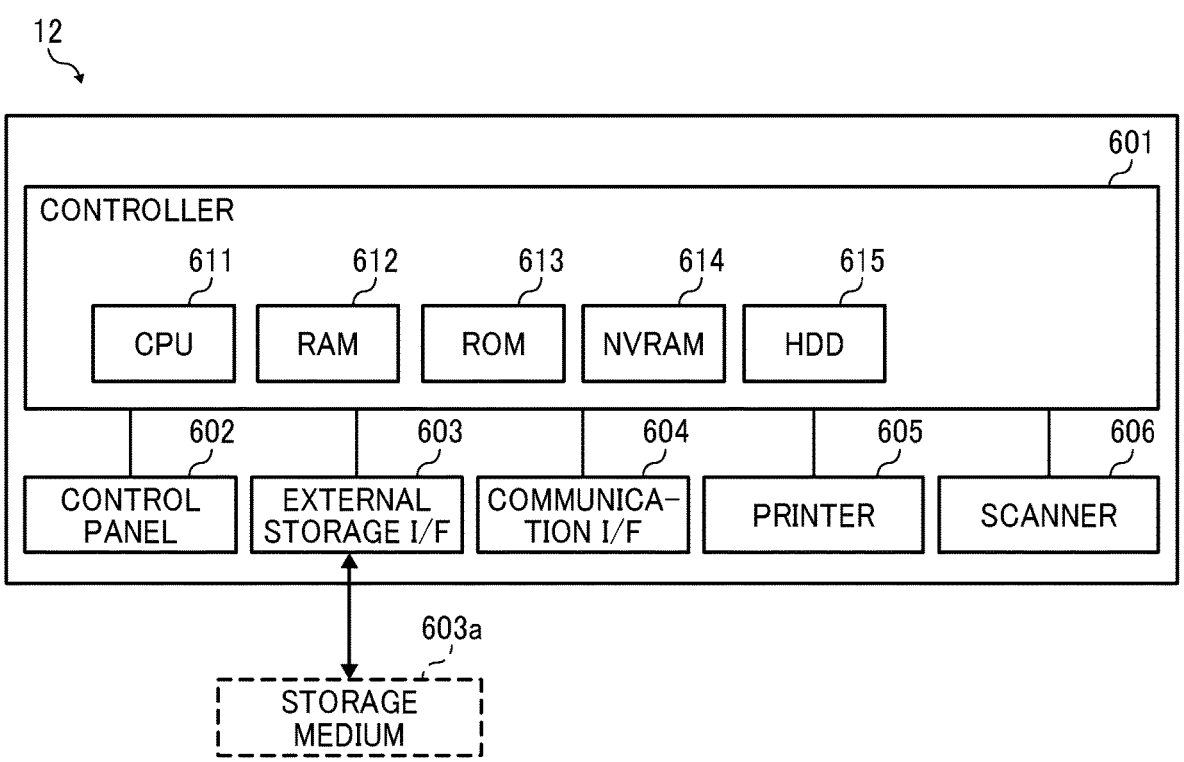
FIG. 3 is a block diagram illustrating an example hardware configuration of an image forming apparatus according to an embodiment of the present disclosure.

The image forming apparatus 12 of FIG. 1 has a hardware configuration as illustrated in FIG. 3. FIG. 3 is a block diagram illustrating an example hardware configuration of the image forming apparatus 12 according to the first embodiment. As illustrated in FIG. 3, the image forming apparatus 12 includes a controller 601, a control panel 602, an external interface 603, a communication interface 604, a printer 605, and a scanner 606.

The controller 601 includes a CPU 611, a RAM 612, a ROM 613, a non-volatile random access memory (NVRAM) 614, and a HDD 615. The ROM 613 stores various programs and data. The RAM 612 stores programs and data temporarily. The NVRAM 614 stores setting information, etc., for example. The HDD 615 stores various programs and data.

The CPU 611 performs processing according to the programs, data, setting information, etc., read from the ROM 613, the NVRAM 614, the HDD 615, etc., onto the RAM 612 to control an entire operation of the image forming apparatus 12 and implement functions.

The control panel 602 includes an input unit that receives a user input, and a display unit that displays various types of information. The external interface 603 is an interface device with an external device. Examples of the external device include a storage medium 603a. The external interface 603 enables the image forming apparatus 12 to read or write data from or to the storage medium 603a. Examples of the storage medium 603a include an IC card, a flexible disc, a CD, a DVD, a SD memory card, and a USB memory.

The communication interface 604 is an interface device to connect the image forming apparatus 12 to the network N. The image forming apparatus 12 performs data communication via the communication interface 604. The printer 605 is a printing device that forms an image on a transferred medium in accordance with print data. Examples of the transferred medium include paper, coated paper, thick paper, overhead projector (OHP) transparencies, plastic films, prepreg, and copper foil. The scanner 606 is a reading device that scans a document to obtain image data (electronic data).

Figure 4:
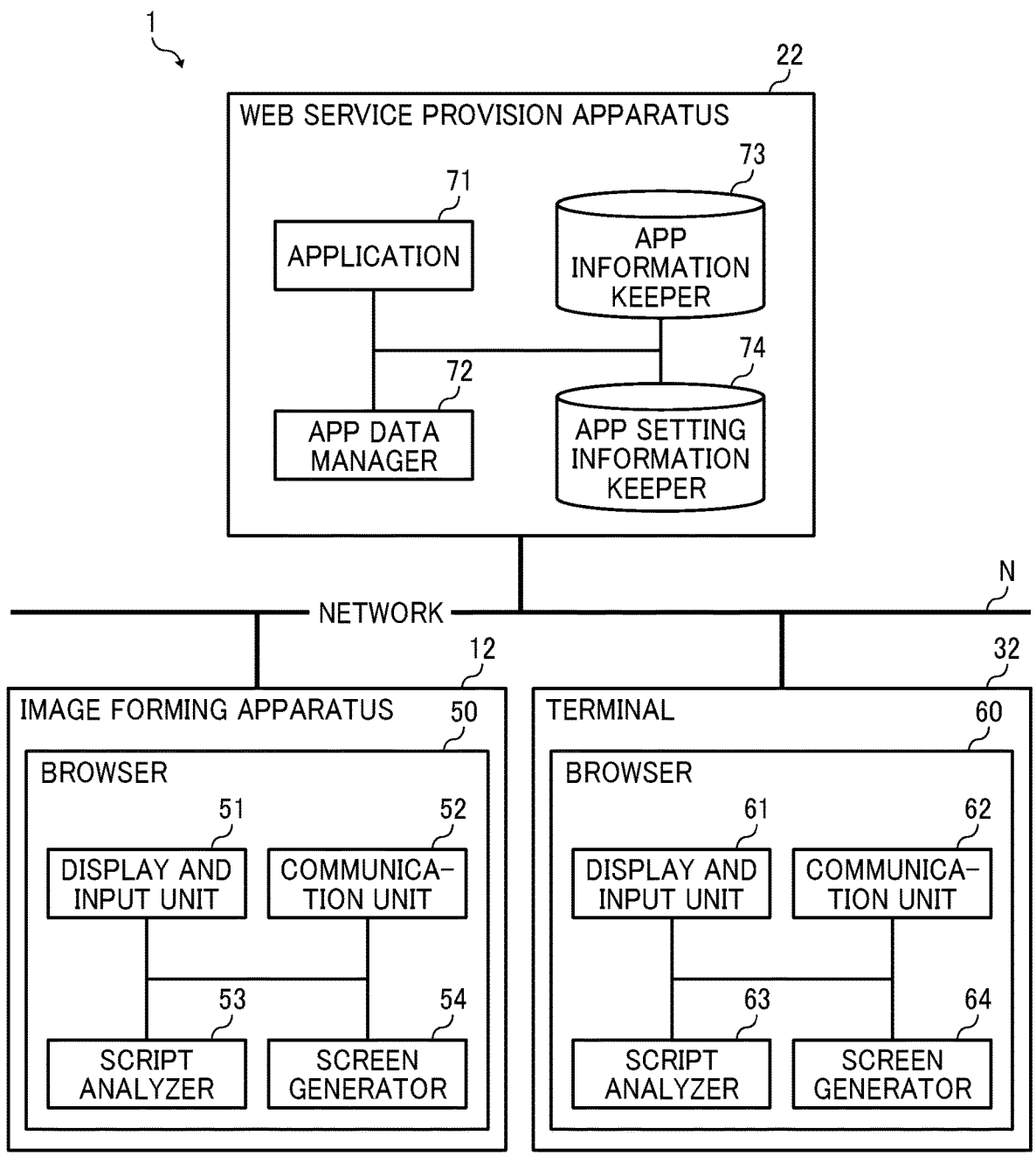
FIG. 4 is a block diagram illustrating an example functional configuration of the information processing system according to an embodiment of the present disclosure.

The image forming apparatus 12, the Web service provision apparatus 22, and the terminal 32 according to the first embodiment are implemented by processing blocks as illustrated in FIG. 4, for example. FIG. 4 is a block diagram illustrating an example functional configuration of the information processing system 1 according to the first embodiment.

As illustrated in FIG. 4, a browser 50 is installed on the image forming apparatus 12 of the information processing system 1. The image forming apparatus 12 implements a display/input unit 51, a communication unit 52, a script analyzer 53, and a screen generator 54 by the browser 50.

Further, as illustrated in FIG. 4, the Web service provision apparatus 22 of the information processing system 1 executes a program to implement an application 71, an application data manager 72, an application information storage 73, and an application setting value information storage 74. As illustrated in FIG. 4, a browser 60 is installed on the terminal 32 of the information processing system 1. The terminal 32 implements a display/input unit 61, a communication unit 62, a script analyzer 63, and a screen generator 64 by the browser 60.

The browser 50 of the image forming apparatus 12 acquires static files or uses Web services or online services via the communication unit 52. The script analyzer 53 analyzes and executes script languages such as JavaScript (registered trademark). The screen generator 54 parses acquired HTML data and performs rendering. The display/input unit 51 displays various screens to a user and accepts various input operations from a user.

The browser 60 of the terminal 32 acquires static files or uses Web services or online services via the communication unit 62. The script analyzer 63 analyzes and executes script languages. The screen generator 64 parses acquired HTML data and performs rendering. The display/input unit 61 displays various screens to a user and accepts various input operations from a user.

The application 71 of the Web service provision apparatus 22 provides the image forming apparatus 12 and the terminal 32 with various Web services. The application data manager 72 acquires the application information from the application information storage 73 and updates the application information. The application data manager 72 acquires the application setting value information from the application setting value information storage 74 or updates the application setting value information.

The application information storage 73 holds the application information as illustrated in FIG. 5. FIG. 5 is an illustration of an example of the application information. As illustrated in FIG. 5, the application information associates respective ones of application IDs with respective ones of application setting screen metadata. The application ID is an example of information identifying the application 71. A detailed description is given later of the application setting screen metadata.

The application setting value information storage 74 holds the application setting value information as illustrated in FIG. 6, for example. FIG. 6 is an illustration of an example configuration of the application setting value information. As illustrated in FIG. 6, the application setting value information associates respective ones of application setting value IDs, respective ones of application setting values, and respective ones of the application IDs with one another. The application setting value ID is an example of information identifying an application setting value. A detailed description is given later of the application setting value. The application ID is an example of information identifying the application 71. Because as illustrated in FIG. 6, the application setting value ID is set in the application setting value information, a plurality of application setting values (e.g., setting values for respective ones of users) could be set to the application 71 identified by the same application ID.

FIGS. 7A and 7B are an illustration of an example configuration of the application setting screen metadata. One screen of an application setting screen, which will be described later, is generated based on the application setting screen metadata of FIGS. 7A and 7B. Referring to FIGS. 7A and 7B, "sections" is a key indicating a collection of multiple "section"s. More specifically, the "section" in FIGS. 7A and 7B is a key indicating a concept for a collection of multiple "field"s, each field being a setting item.

The "section" and "field" in FIGS. 7A and 7B are configured as illustrated in FIG. 8A and FIG. 8B, respectively. FIG. 8A illustrates an example configuration of "section". As illustrated in FIG. 8A, "section" includes "id", "label" and "fields". The "id" is a character string identifying "section". The "label" is a section's title displayed on the application setting screen. The "fields" indicates a collection of multiple "filed"s.

FIG. 8B illustrates an example configuration of "field". As illustrated in FIG. 8B, "field" includes "id", "label", "type", "items", and appropriateness check information such as "required" and "maxlength". The "id" is a character string identifying "field". The "label" is a title of a setting item displayed on the application setting screen.

The "type" indicates a type of setting items. As illustrated in FIG. 8B, examples of the type of setting items include a one-line text, a drop-down list, a multiple-line text, a radio button, and a check box. The "items" is used in a case in which "type" is any one of the drop-down list, the radio button and the check box, for example. In an example of FIG. 8B, options are indicated by "value" and "label". The "value" indicates a value of each option and is a value set to the application setting value. The "label" is a label of each option displayed on the application setting screen.

FIG. 9 is an illustration of an example configuration of an application setting value. As illustrated in FIG. 9, an application setting value is associated with "id" of a setting item. For example, in FIG. 9, "default_filename", which is "id" of a setting item, is associated with "(QUOTE)", which is an application setting value. Further, "date_format", which is "id" of a setting item, is associated with "yyyy-mm-dddd", which is an application setting value. In addition, "cloud_service", which is "id" of a setting item, is associated with "XXX", which is an application setting value.

Hereinafter, a detailed description is given of an operation performed by the information processing system 1 according to the first embodiment.

Figure 11:
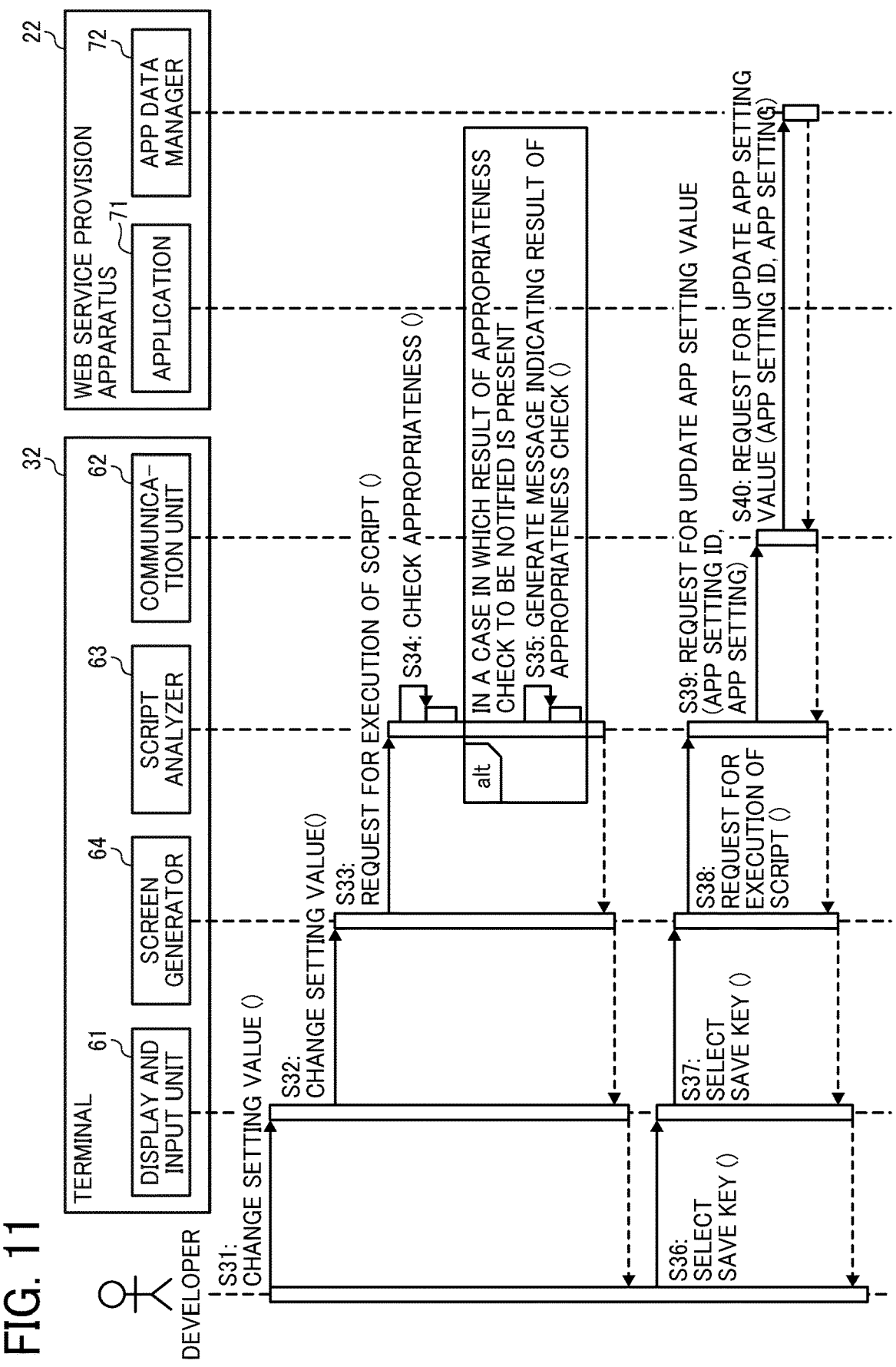

For example, a developer of the application 71 changes application settings via the application setting screen displayed on the terminal 32 as indicated in a sequence diagram of FIGS. 10A, 10B and 11. FIGS. 10A, 10B and 11 are a sequence diagram illustrating an example operation of setting an application.

At S11, the terminal 32 accepts a developer instruction that requests display of an application setting list screen through the display/input unit 61. At S12, the display/input unit 61 requests the screen generator 64 to generate the application settings list screen. At S13 and S14, the screen generator 64 acquires HTML data of the application settings list screen from the application 71 of the Web service provision apparatus 22 via the communication unit 62.

At S15, the screen generator 64 generates the application setting list screen based on the acquired HTML data. At S16, the screen generator 64 requests the script analyzer 63 to execute a script contained in the acquired HTML data. The script analyzer 63 executes the script contained in the HTML data to perform subsequent processing.

Figures 12, 13:
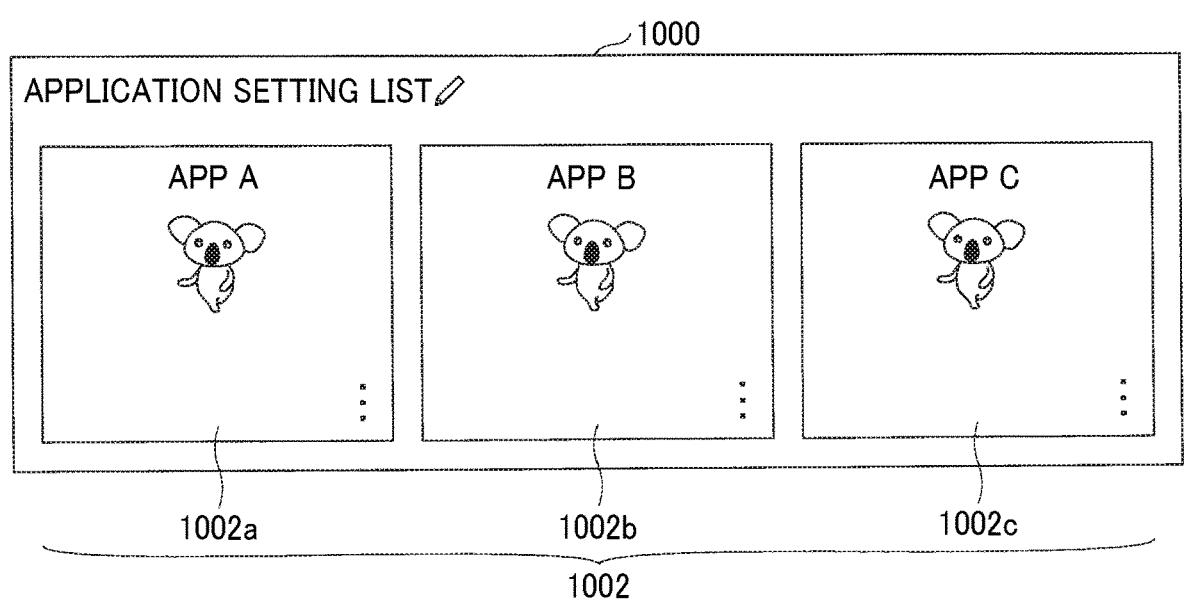
FIG. 12 is an illustration of an example configuration of an application setting value ID list according to an embodiment of the present disclosure.
FIG. 13 is a conceptual drawing illustrating an example of an application setting list screen according to an embodiment of the present disclosure.

At S17 and S18, the script analyzer 63 requests the application data manager 72 of the Web service provision apparatus 22 for an application setting value ID list. The application data manager 72 reads out each application setting value ID from the application setting value information as illustrated in FIG. 6 stored in the application setting value information storage 74 to generate the application setting value ID list as illustrated in FIG. 12. FIG. 12 is an illustration of an example configuration of the application setting value ID list.

The script analyzer 63 acquires the application setting value ID list as illustrated in FIG. 12. At S19, the script analyzer 63 generates an application setting list screen 1000 as illustrated in FIG. 13 based on the acquired application setting value ID list.

FIG. 13 is an illustration of an example of the application setting list screen 1000. The application setting list screen 1000 includes keys 1002a to 1002c. A uniform resource locater (URL) for transitioning to each application setting screen is set to each of the keys 1002a to 1002c. This URL for transitioning to each application setting screen includes the application setting value ID. For example, an URL of "http://example.com/settings/879QOWI0" is allocated to the key 1002a corresponding to Application A. "879QOWI0" contained in this URL is the application setting value ID.

At S20, the display/input unit 61 of the terminal 32 accepts a developer instruction that requests display of the application setting screen according to a user selection of at least one of the keys 1002 on the application setting list screen 1000. At S21, the display/input unit 61 of the terminal 32 requests the screen generator 64 to generate the application settings screen while specifying the URL that is set to the key 1002 selected by the developer.

At S22 and S23, the screen generator 64 acquires an application setting screen template (HTML data) as illustrated in FIG. 14 from the application 71 of the Web service provision apparatus 22. FIG. 14 is an illustration of an example configuration of the application setting screen template. As illustrated in FIG. 14, the application setting screen template is HTML data of a screen on which an area displaying a setting item and a save key are present, the screen not including information specific to each application 71.

At S24, the screen generator 64 generates the application setting screen template based on the acquired HTML data. At S25, the screen generator 64 requests the script analyzer 63 to execute a script contained in the acquired HTML data. The script analyzer 63 executes the script contained in the HTML data to perform subsequent processing.

At S26 and S27, the script analyzer 63 requests the application data manager 72 of the Web service provision apparatus 22 for application setting screen metadata. More specifically, the script analyzer 63 requests acquisition of the application setting screen metadata by using the application setting value ID of the URL that is set to the key 1002 selected by the developer as a key.

The application data manager 72 acquires the application setting value information from the application setting value information storage 74 by using the application setting value ID as a key. Next, the application data manager 72 acquires application information from the application information storage 73 by using an application ID contained in the acquired application setting value information as a key. The application data manager 72 acquires application setting screen metadata contained in the acquired application information, and sends the application setting screen metadata to the script analyzer 63 of the terminal 32.

At S28 and S29, the script analyzer 63 requests the application data manager 72 of the Web service provision apparatus 22 for an application setting value. More specifically, the script analyzer 63 requests acquisition of the application setting value by using the application setting value ID of the URL that is set to the key 1002 selected by the developer as a key.

The application data manager 72 acquires the application setting value information from the application setting value information storage 74 by using the application setting value ID as a key. The application data manager 72 acquires the application setting value included in the acquired application setting value information, and sends the application setting value to the script analyzer 63 of the terminal 32. It should be noted that the application data manager 72 sends a default application setting value for the first time.

At S30, the script analyzer 63 generates a setting item part in the application setting screen based on the application setting screen metadata and the application setting value to fill in the "area displaying a setting item" in the application setting screen template illustrated in FIG. 14. More specifically, at S30, the script analyzer 63 determines an HTML element to be used based on mapping information as illustrated in FIG. 15. FIG. 15 is an illustration of an example configuration of the mapping information associating a type of setting item with HTML data. It should be noted that the mapping information is included in a script that the application setting screen template has.

With the operation described so far, the terminal 32 generates HTML data of the application setting screen 1100 as illustrated in FIG. 16. The application setting screen 1100 illustrated in FIG. 16 is based on the application setting screen metadata of FIGS. 7A and 7B and the application setting value of FIG. 9.

At S31, the display/input unit 61 of the terminal 32 accepts a developer instruction that requests a change of the application setting value through the application setting screen 1100. At S32, the display/input unit 61 of the terminal 32 notifies the screen generator 64 of the change of the application setting value. At S33, the screen generator 64 requests the script analyzer 63 to execute a script corresponding to the application setting screen 1100. At S34, the script analyzer 63 determines whether the changed application setting value is appropriate using the appropriateness check information included in the application setting screen metadata of FIGS. 7A and 7B.

In a case in which there is a need to notify a result of the appropriateness check, for example, in a case in which a result of the appropriateness check performed at S34 indicates that the changed application setting value include an inappropriate application setting value, the script analyzer 63 generates a message indicating the result of the appropriateness check at S35. Further, the script analyzer 63 causes the display/input unit 61 of the terminal 32 to display the generated message.

At S36, the display/input unit 61 of the terminal 32 accepts a developer selection of a save key on the application setting screen 1100. At S37, the display/input unit 61 of the terminal 32 notifies the screen generator 64 of the selection of the save key.

At S38, the screen generator 64 requests the script analyzer 63 to execute a script corresponding to the selection of the save key. At S39 and S40, the script analyzer 63 requests the application data manager 72 of the Web service provision apparatus 22 to update the application setting value to the application setting value changed according to the developer instruction given through the application setting screen 1100. In response to the request from the terminal 32 for updating the application setting value, the application data manager 72 updates the application setting value in the application setting value information storage 74.

This enables a developer of the application 71 to update an application setting value through the application setting screen 1100 generated based on the application setting screen metadata. Further, the developer can dynamically recognize an appropriateness of the changed application setting value. Furthermore, the developer can change a setting item on the application setting screen in a simple manner by editing the application setting screen metadata.

Accordingly, the developer can prepare the application setting screen 1100 in a simple manner depending on a setting item or an application setting value that is to be set to an application screen described later and check an appropriateness of the application setting values. This improves efficiency in developing a web application.

Figure 17:
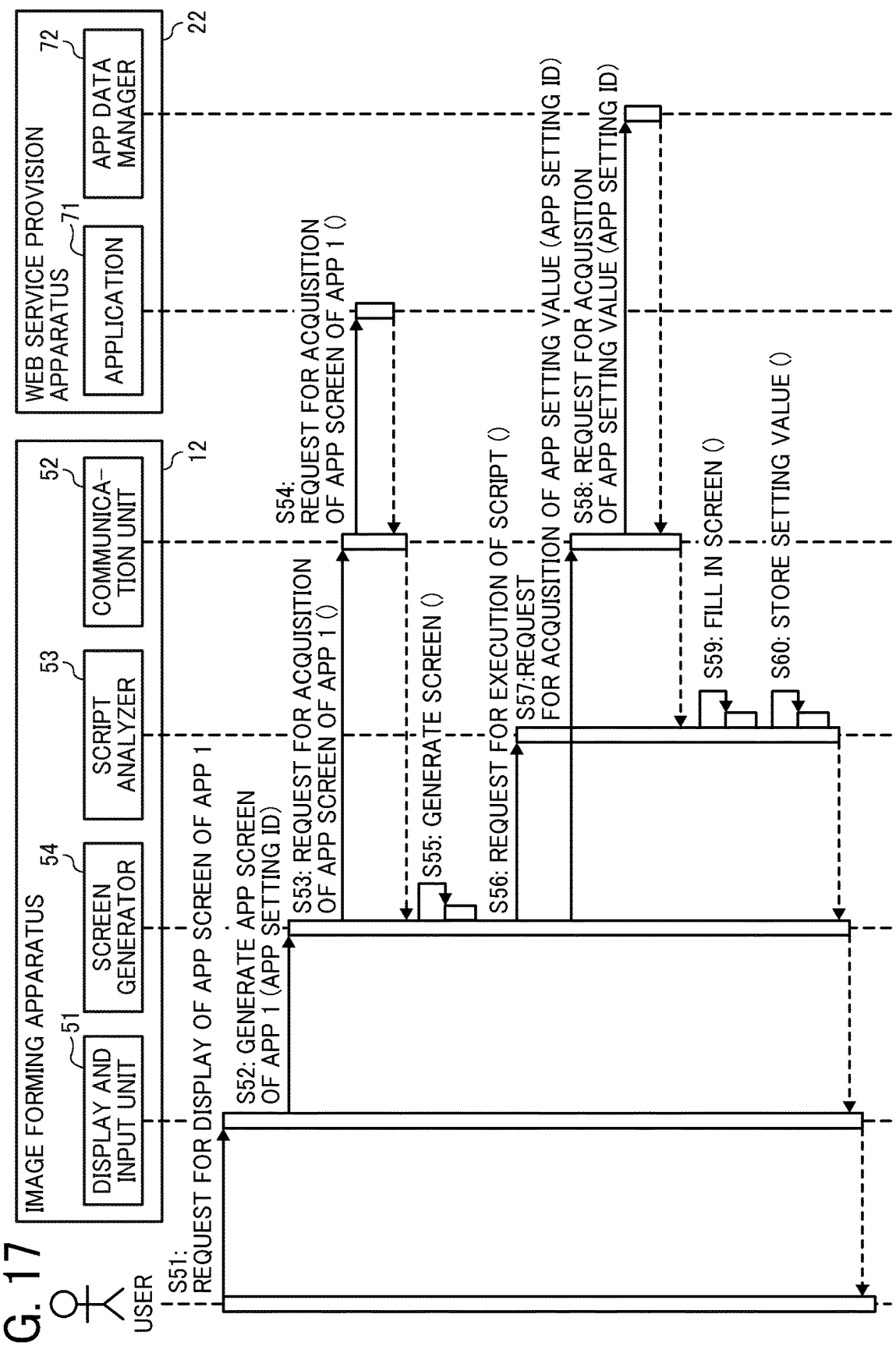
FIG. 17 is a sequence diagram illustrating an example operation of using an application according to an embodiment of the present disclosure.

FIG. 17 is a sequence diagram illustrating steps in an operation of using the application 71 through an application screen of the application 71 displayed on the image forming apparatus 12.

At S51, the image forming apparatus 12 accepts a user instruction that requests display of an application screen through the display/input unit 51. For example, the application setting value ID is included in a path or a query parameter of a URL of the application screen of "app 1" as a target of the request for displaying the application screen. The URL of the application screen is, for example, "http://example.com/apps/appl.html?appdata_id=879QOWI0". "879QOWI0" contained in this URL is the application setting value ID.

At S52, the display/input unit 51 requests the screen generator 54 to generate the application screen of "app 1" while specifying the application setting value ID. At S53 and S54, the screen generator 54 acquires, via the communication unit 52, HTML data of the application screen of "app 1" from the application 71 of the Web service provision apparatus 22.

At S55, the screen generator 54 generates the application screen based on the acquired HTML data. At S56, the screen generator 54 requests the script analyzer 53 to execute a script contained in the acquired HTML data. The script analyzer 53 executes the script contained in the HTML data to perform subsequent processing.

At S57 and S58, the script analyzer 53 requests the application data manager 72 of the Web service provision apparatus 22 for an application setting value. The application data manager 72 reads out the application setting value as illustrated in FIG. 9 from the application setting value information storage 74 by using the application setting value ID as a key. Further, the application data manager 72 sends the read-out application setting value to the script analyzer 53 of the image forming apparatus 12.

Figure 18:
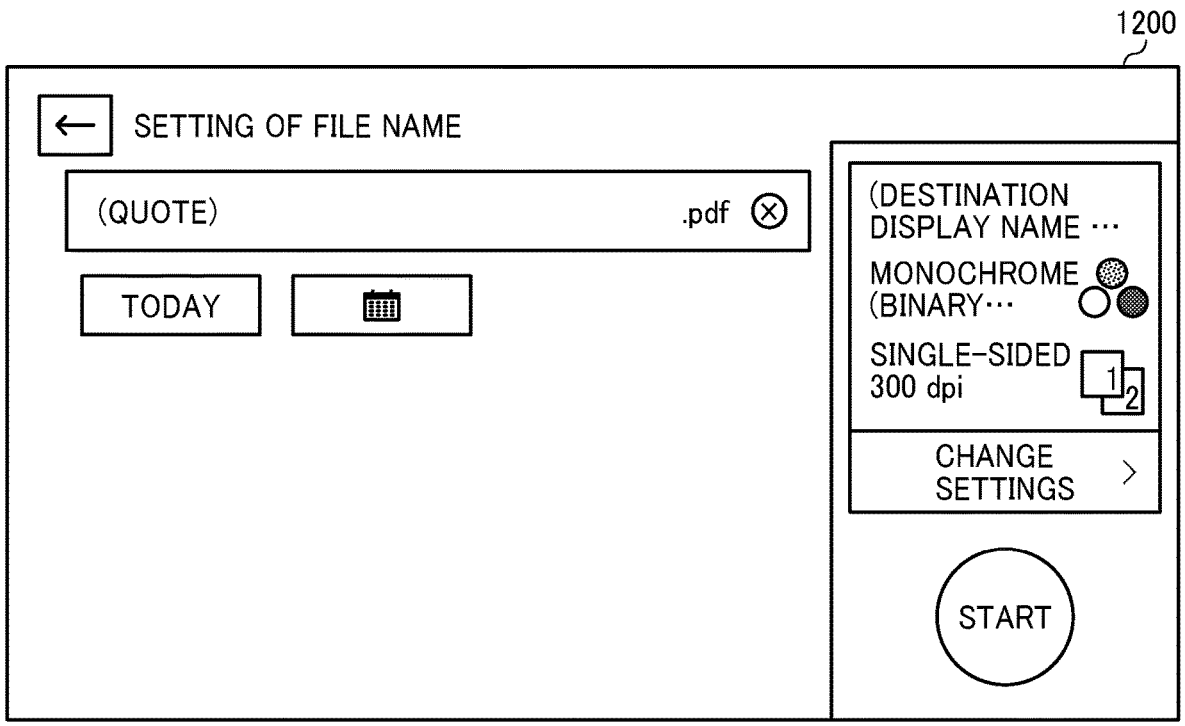
FIG. 18 is a conceptual drawing illustrating an example of an application screen according to an embodiment of the present disclosure.

At S59, the script analyzer 53 fills in a user interface (UI) based on the acquired application setting value on an application screen 1200 as illustrated in FIG. 18. FIG. 18 is an illustration of an example of an application screen. FIG. 18 illustrates the application screen 1200 in which an UI is filled in based on the application setting value of FIG. 9. FIG. 18 illustrates an example of the application screen 1200 on which a "FILE NAME" field reflects (QUOTE) as a file name initial value (default_filename) included in the application setting value.

At S60, the script analyzer 53 retains one or more parameters from among the application setting value as illustrated in FIG. 9 on a memory, the parameter being used for other than the UI. In an example of the application setting value as illustrated in FIG. 9, a date format (date_format) and a cloud service (cloud_service) are retained on a memory.

Figure 19:
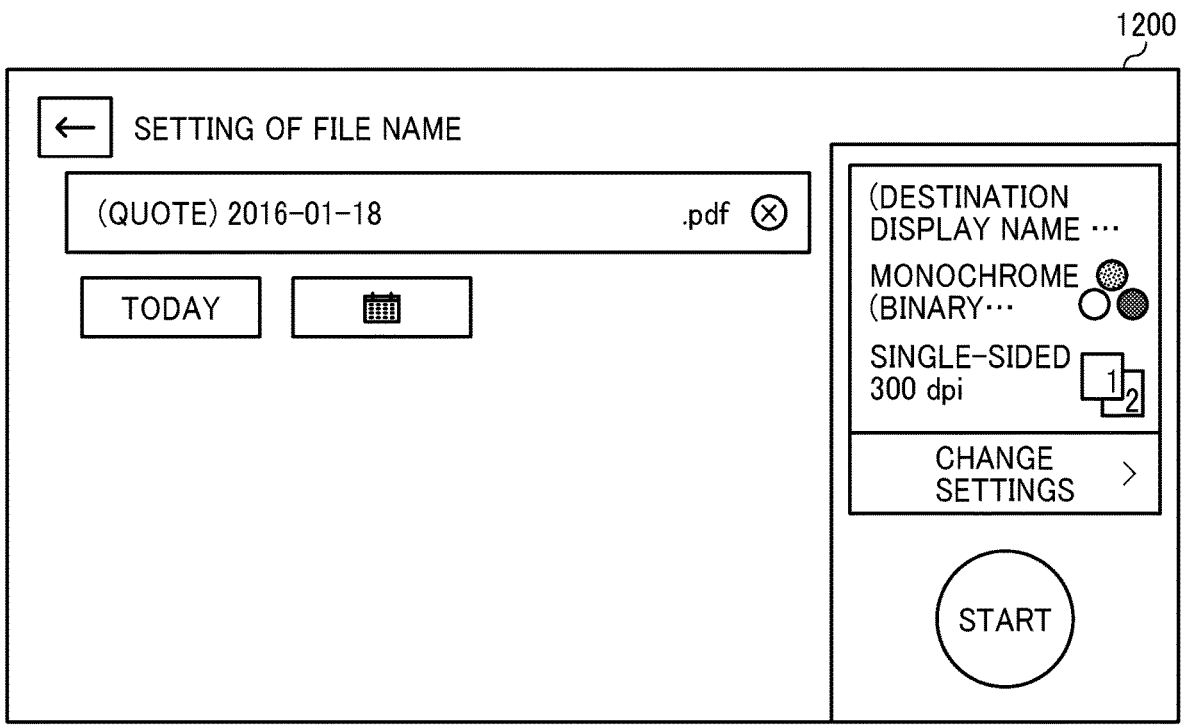
FIG. 19 is a conceptual drawing illustrating an example of the application screen which a date is reflected in a "FILE NAME" field according to an embodiment of the present disclosure.

It should be noted that the date format (date_format) is a parameter used for enabling the "FILE NAME" field to reflect a date as illustrated in the application screen 1200 of FIG. 19 in response to a selection of "TODAY" key on the application screen 1200 of FIG. 18. FIG. 19 is an illustration of an example of an application screen on which a date is reflected in the "FILE NAME" field. It should be noted that, FIG. 19 illustrates an example in which, a character string indicating a today's date is generated and attached to the file name on the application screen 1200 according to yyyy-dd-mm as the date format (date_format) included in the application setting value.

Further, the cloud service (cloud_service) is used when scanning a document in response a user selection of a "START" key on the application screen 1200 and uploading a file of the scanned document. In a case in which "XXX" is set to the cloud service, the file obtained by scanning a document is sent to a URL "http://example.com/upload?service=xxx", for example.

Although FIGS. 7A and 7B illustrate an example of the application setting screen metadata for a cloud scanning service, any other suitable service may be provided. FIGS. 20A to 20C are an illustration of an example configuration of application setting screen metadata for a Scan to Email service. In addition, FIG. 21 is an illustration of an example configuration of application setting screen metadata for a cloud printing service.

An application setting screen as illustrated in FIG. 22 is generated based on the application setting screen metadata of FIGS. 20A to 20C. FIG. 22 is an illustration of an example of an application setting screen for the Scan to Email service. The application setting screen of FIG. 22 includes a mail subject, a mail text, and a scan color mode, each being a setting item. The mail subject is a subject of an email for sending a scanned file. The mail text is a text of the email for sending the scanned file. The scan color mode is a scan color mode selected by default.

An application setting screen as illustrated in FIG. 23 is generated based on the application setting screen metadata of FIG. 21. FIG. 23 is an illustration of an example of an application setting screen for the cloud printing service. The application setting screen of FIG. 23 includes a default folder ID, a print color mode, and a check box mail for prohibiting a change of the print color mode, each being a setting item.

The default folder ID is an ID of a folder that is displayed first at the image forming apparatus 12. The print color mode is a print color mode selected by default. Putting a mark in the check box for prohibiting change of print color mode disables a change of the print color mode according to an instruction given from a user of the image forming apparatus 12. For example, when "monochrome" is set to the print color mode as illustrated in FIG. 23 and a mark is put in the check box, a monochrome print is forced.

FIG. 32 is an illustration of an example configuration of application setting screen metadata based on which an application setting screen including a text box that requires input is generated. In FIG. 32, "required: true" as appropriateness information indicates that a field of a single text whose "id" is "userName" requires input. A check box that requires selection can be also generated by using the appropriateness information "required: true" illustrated in FIG. 32.

FIG. 33 is an illustration of an example of the application setting screen including a text box that requires input. As illustrated in FIG. 33, the application setting screen metadata of FIG. 32 enables determination of the appropriateness of an application setting value based on whether an application setting value is input.

FIG. 34 is an illustration of an example configuration of application setting screen metadata based on which an application setting screen including a text box that only accepts integers. In FIG. 34, "number: true" as appropriateness information indicates that a field of a single text whose "id" is "copies" only accepts integers. The text box that only accepts integers is generated by using the appropriateness information "number: true" of FIG. 34. Further, a text box that only accepts an email address can be generated in substantially the same manner. The application setting screen metadata of FIG. 34 enables determination of the appropriateness of an entered application setting value based on a type of the entered application setting value.

FIG. 35 is an illustration of an example configuration of application setting screen metadata based on which an application setting screen including a text box that only accepts a numerical value greater than or equal to 1. In FIG. 35, "number: true" and "minvalue: 1" as appropriateness information indicates that a field of a single text whose "id" is "copies" only accepts a numeric value greater than or equal to 1. The text box that only accepts a numeric value greater than or equal to 1 is generated by using the appropriateness information "number: true" and "minvalue: 1" of FIG. 34. The application setting screen metadata of FIG. 35 enables determination of the appropriateness of an entered application setting value based on a value of the entered application setting value.

FIG. 36 is an illustration of an example configuration of application setting screen metadata based on which an application setting screen including a text box that only accepts a character string of 10 characters or less. In FIG. 36, "maxlength: 10" as appropriateness information indicates that a field of a single text whose "id" is "defaultFileName" only accepts a character string of 10 characters or less. The text box that only accepts a character string of 10 characters or less is generated by using the appropriateness information "maxlength: 10" of FIG. 36.

FIG. 37 is an illustration of an example of the application screen including the text box that only accepts a character string of 10 characters or less. As illustrated in FIG. 37, the application setting screen metadata of FIG. 36 enables determination of the appropriateness of an entered application setting value based on a length of the entered application setting value.

FIG. 38 is an illustration of an example configuration of application setting screen metadata based on which an application setting screen including a first text box and a second text box that only accepts the same value as the one that is entered in the first text box. In FIG. 38, appropriateness information indicates that a field of a single text whose "id" is "password_confirmation" only accepts the same value as the one that is entered in a field of a single text whose "id" is "password". The text box that only accepts the same value as the one that is previously entered, such as "Password" and "Confirmation of Password", is generated by using the appropriateness information of FIG. 38. The application setting screen metadata of FIG. 38 enables determination of the appropriateness of an application setting value that is entered later based on an application setting value that is entered precedently.

FIG. 39 is an illustration of an example configuration of application setting screen metadata based on which an application setting screen including a text box that requires input in an English-language environment but does not require input in a Japanese-language environment. The application setting screen metadata of FIG. 39 implements the text box that requires input in an English-language environment but does not require input in a Japanese-language environment, enabling determination of the appropriateness of the application setting value depending on language information of metadata.

FIG. 40 is an illustration of an example configuration of the application setting screen metadata that supports multi-lingualization of a message indicating a result of the appropriateness check. The application setting screen metadata of FIG. 40 enables multilingualization of a message indicating a result of the appropriateness check.

Figure 41A:
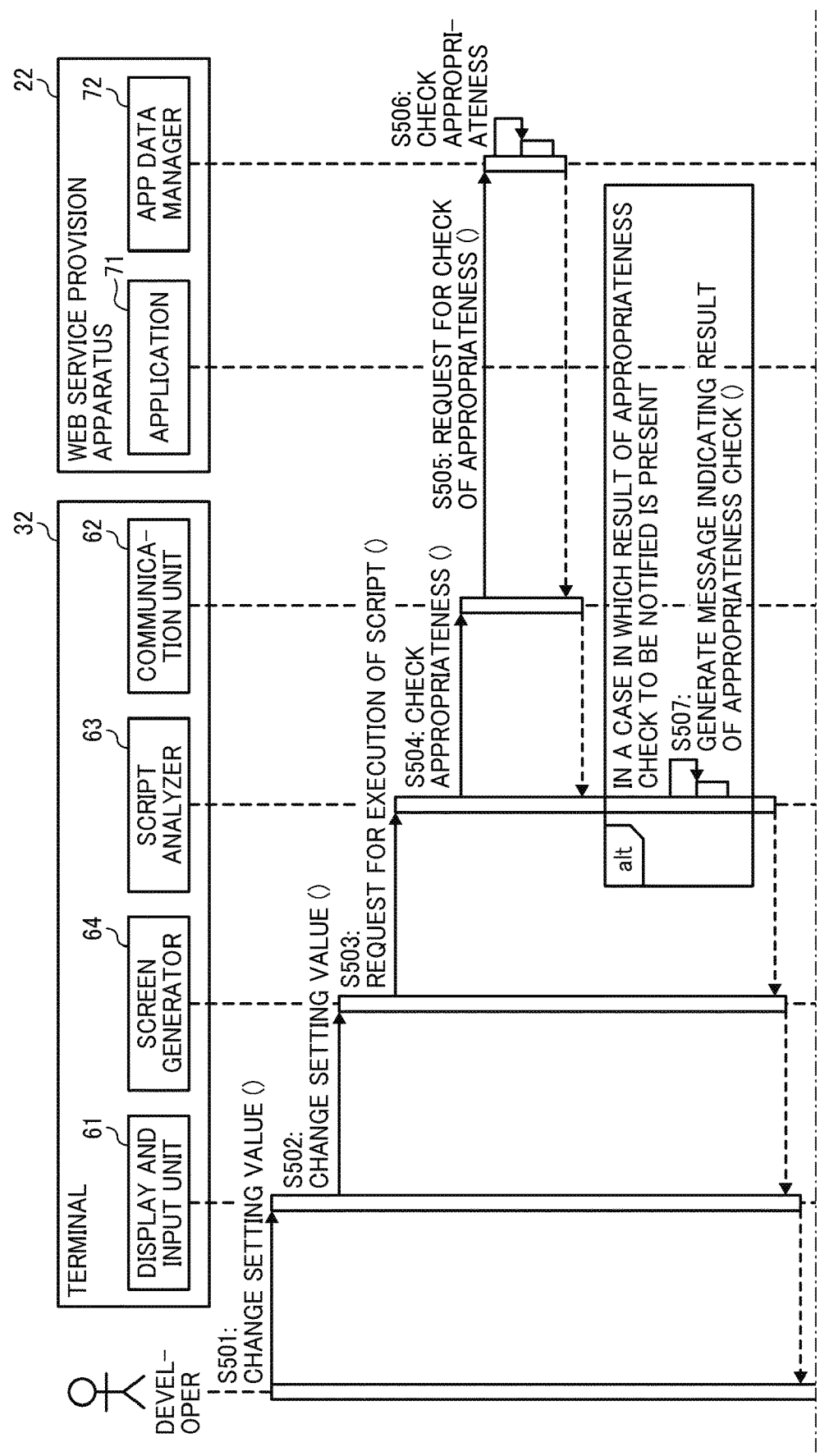
FIGS. 41A and 41B are a sequence diagram illustrating an example operation of setting an application performed in a case in which a Web service provision apparatus checks appropriateness of an application setting value according to an embodiment of the present disclosure.
Figure 41B:
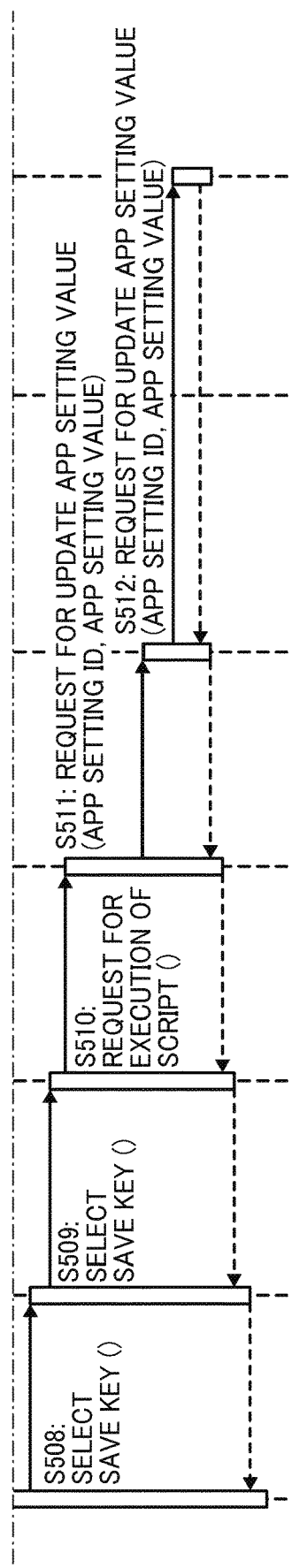

FIGS. 41A and 41B are a sequence diagram illustrating an example operation of setting an application performed in a case in which the Web service provision apparatus 22 checks appropriateness of the application setting value. The operation of S11 to S30 of FIGS. 10A and 10B is performed before S501 of FIG. 41A.

At S501, the terminal 32 accepts a developer instruction that requests a change of an application setting value through the application setting screen 1100. At S502, the display/input unit 61 of the terminal 32 notifies the screen generator 64 of the change of the application setting value. At S503, the screen generator 64 requests the script analyzer 63 to execute a script corresponding to the application setting screen 1100. At S504 and S505, the script analyzer 63 requests the application data manager 72 of the Web service provision apparatus 22 to check appropriateness of the changed application setting value.

At S506, the application data manager 72 of the Web service provision apparatus 22 checks whether the changed application setting value is appropriate by using the appropriateness check information included in the application setting screen metadata of FIGS. 7A and 7B. In a case in which there is a need to notify a result of the appropriateness check, for example, in a case in which the changed application setting value includes an inappropriate application setting value, the application data manager 72 notifies the script analyzer 63 of the result of the appropriateness check. At S507, the script analyzer 63 generates a message indicating the result of the appropriateness check and causes the display/input unit 61 of the terminal 32 to display the generated message. Operation of S508 to S512 is performed in substantially the similar manner as described above referring to S36 to S40 of FIG. 11, and the description thereof is omitted.

Figure 42B:
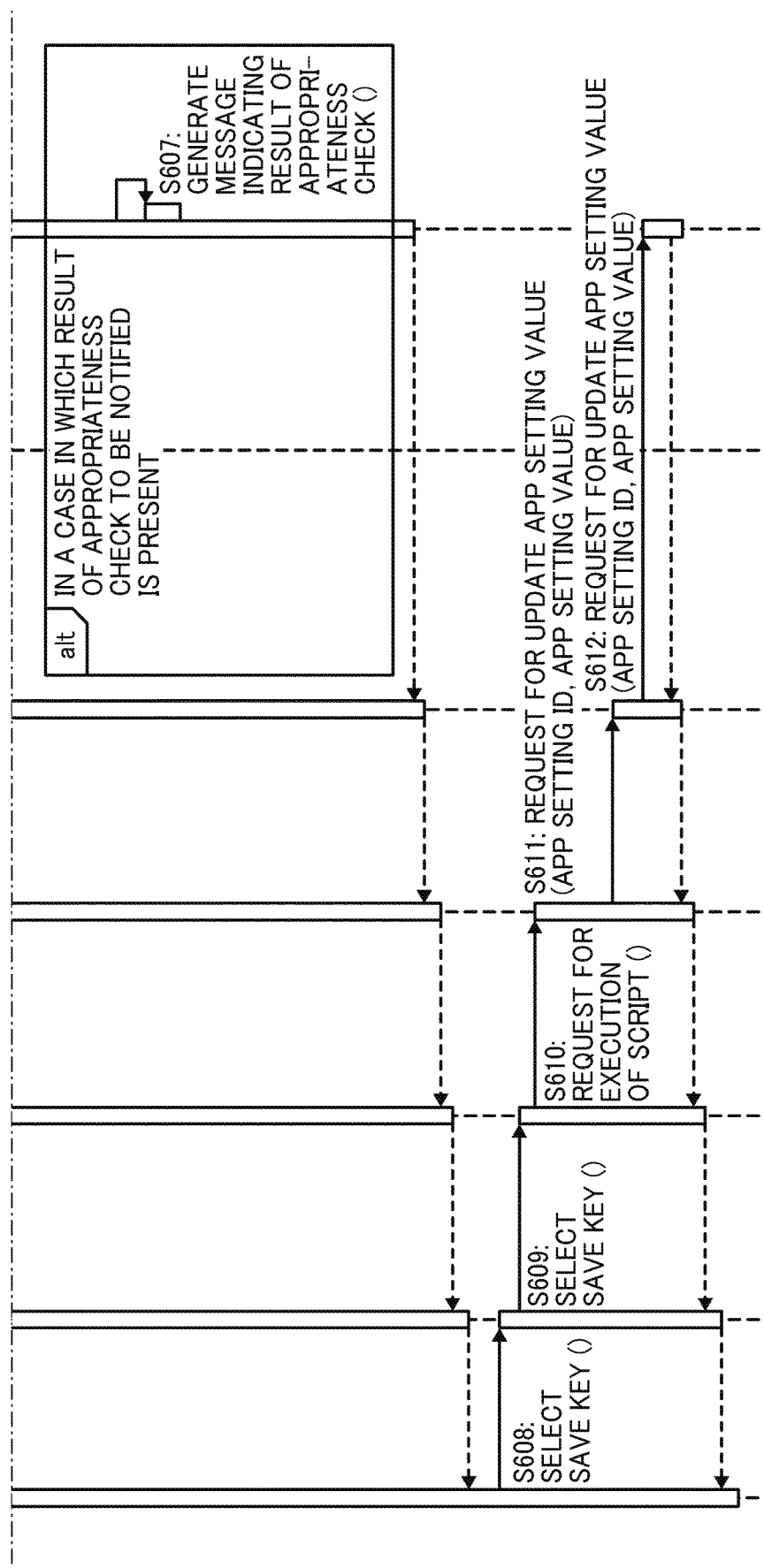

FIGS. 42A and 42B are a sequence diagram illustrating an example operation of setting an application performed in a case in which the Web service provision apparatus 22 generates a message indicating a result of check of appropriateness of an application setting value. The operation of S11 to S30 of FIGS. 10A and 10B is performed before S601 of FIG. 42A.

At S601, the terminal 32 accepts a developer instruction that requests a change of an application setting value through the application setting screen 1100. At S602, the display/input unit 61 of the terminal 32 notifies the screen generator 64 of the change of the application setting value. At S603, the screen generator 64 requests the script analyzer 63 to execute a script corresponding to the application setting screen 1100.

At S604, the script analyzer 63 determines whether the changed application setting value is appropriate using the appropriateness check information included in the application setting screen metadata of FIGS. 7A and 7B. In a case in which there is a need to notify a result of the appropriateness check, for example, in a case in which the changed application setting value includes an inappropriate application setting value, the operation proceeds to S605 and S606. At S605 and S606, the script analyzer 63 requests the application data manager 72 of the Web service provision apparatus 22 to generate a message indicating the result of the appropriateness check.

At S607, the application data manager 72 generates a message indicating the result of the appropriateness check and causes the display/input unit 61 of the terminal 32 to display the generated message. Operation of S608 to S612 is performed in substantially the similar manner as described above referring to S36 to S40 of FIG. 11, and the description thereof is omitted.

Figure 43B:
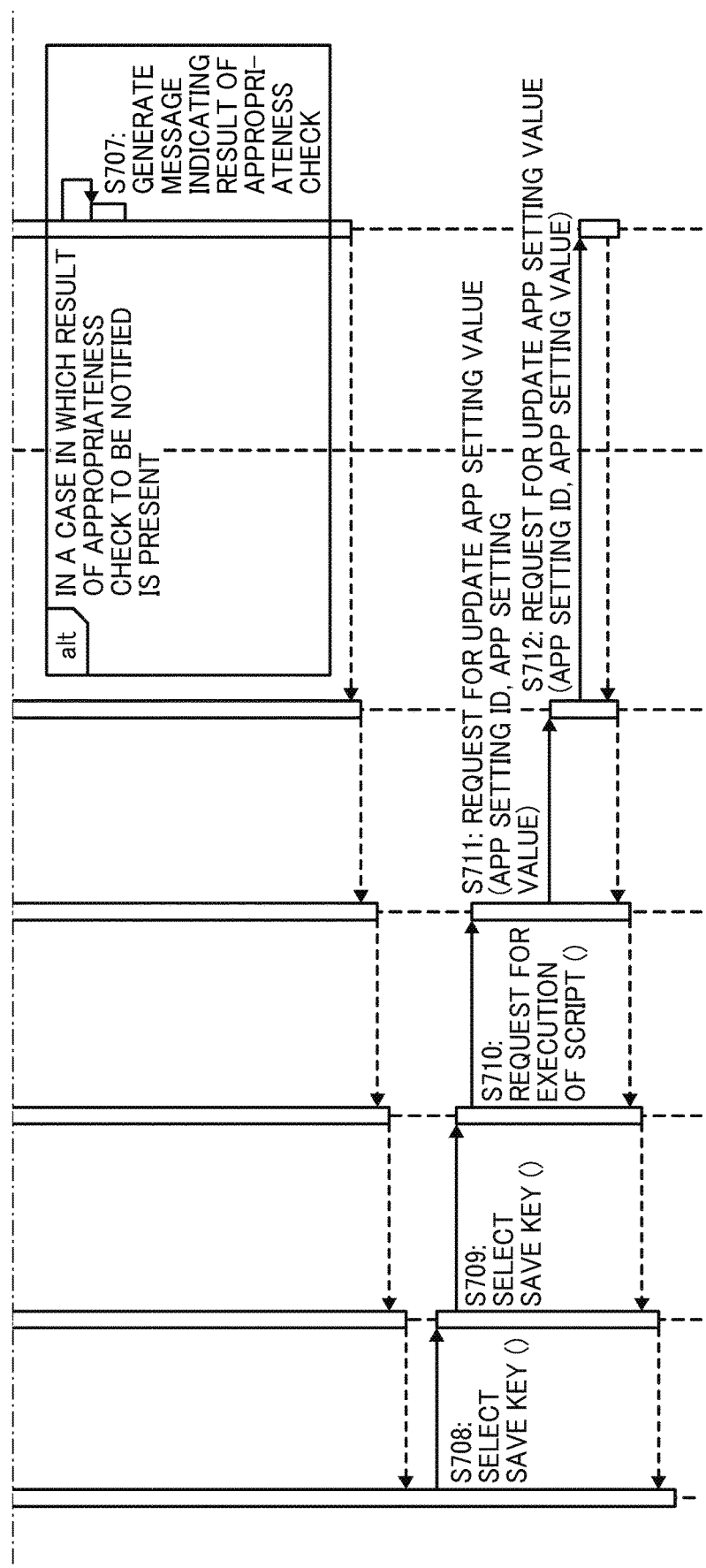

FIGS. 43A and 43B are a sequence diagram illustrating an example operation of setting an application performed in a case in which the Web service provision apparatus 22 checks appropriateness of an application setting value and generates a message indicating a result of check of appropriateness of the application setting value. The operation of S11 to S30 of FIGS. 10A and 10B is performed before S701 of FIG. 43A.

At S701, the terminal 32 accepts a developer instruction that requests a change of an application setting value through the application setting screen 1100. At S702, the display/input unit 61 of the terminal 32 notifies the screen generator 64 of the change of the application setting value. At S703, the screen generator 64 requests the script analyzer 63 to execute a script corresponding to the application setting screen 1100. At S704 and S705, the script analyzer 63 requests the application data manager 72 of the Web service provision apparatus 22 to check appropriateness of the changed application setting value.

At S706, the application data manager 72 of the Web service provision apparatus 22 checks whether the changed application setting value is appropriate by using the appropriateness check information included in the application setting screen metadata of FIGS. 7A and 7B. In a case in which there is a need to notify a result of the appropriateness check, for example, in a case in which the changed application setting value includes an inappropriate application setting value, at S707, the application data manager 72 generates a message indicating the result of the appropriateness check. Further, the application data manager 72 causes the display/input unit 61 of the terminal 32 to display the generated message. Operation of S708 to S712 is performed in substantially the similar manner as described above referring to S36 to S40 of FIG. 11, and the description thereof is omitted.

As described heretofore, the information processing system 1 according to the first embodiment displays the application setting screen 1100 based on the application setting screen metadata and stores an application setting value updated through the application setting screen 1100 in the Web service provision apparatus 22. Further, the information processing system 1 according to the first embodiment is able to dynamically check appropriateness of the application setting value updated through the application setting screen 1100 based on the application setting screen metadata. The information processing system 1 according to the first embodiment having those functions improves efficiency in developing a web application.

Second Embodiment

The information processing system 1 according to a second embodiment multilingualizes the application setting screen metadata of the information processing system 1 according to the first embodiment. A description of elements, members, components, or operations that are same as those of the first embodiment is omitted below.

FIG. 24 is an illustration of an example configuration of application information that supports multilingualization. The application information of FIG. 24 includes multilingual resource data in addition to the application information of FIG. 5. The application information illustrated in FIG. 24 associates respective ones of application IDs, respective ones of application setting screen metadata, and respective ones of multilingual resource data.

FIG. 25 is an illustration of an example configuration of the multilingual resource data. As illustrated in FIG. 25, the multilingual resource data contains resource data of all languages to be supported. For example, the multilingual resource data of FIG. 25 contains resource data for the English language and resource data for the Japanese language.

FIGS. 26A and 26B are an illustration of an example configuration of application setting screen metadata that supports multilingualization. As illustrated in FIGS. 26A and 26B, in the application setting screen metadata that supports multilingualization, {{ }} indicates a part that can be replaced with the multilingual resource data.

Figure 27A:
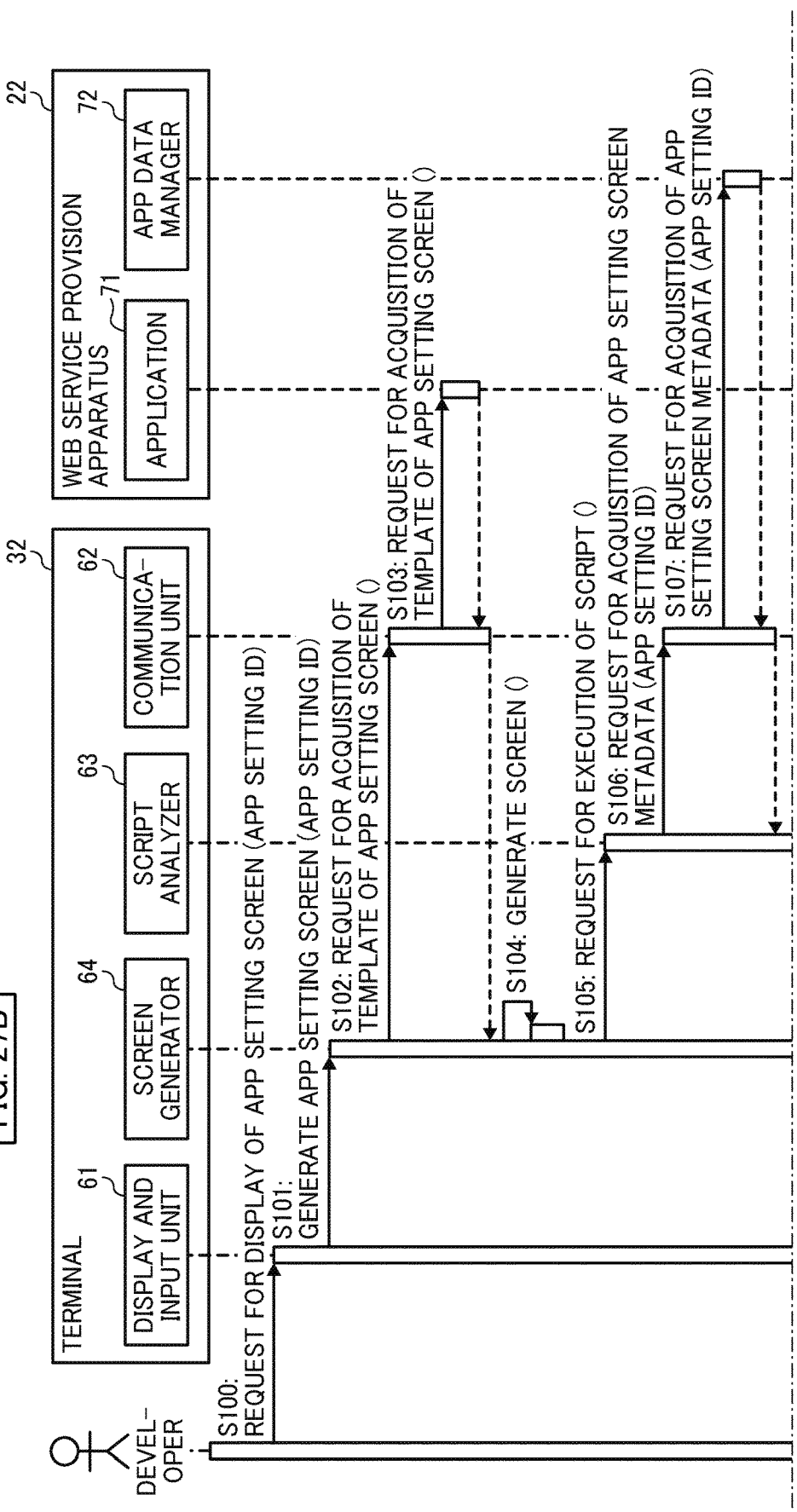
FIGS. 27A and 27B are a sequence diagram illustrating an example operation of setting an application performed in a case in which multilingualization is performed according to an embodiment of the present disclosure.
Figure 27B:
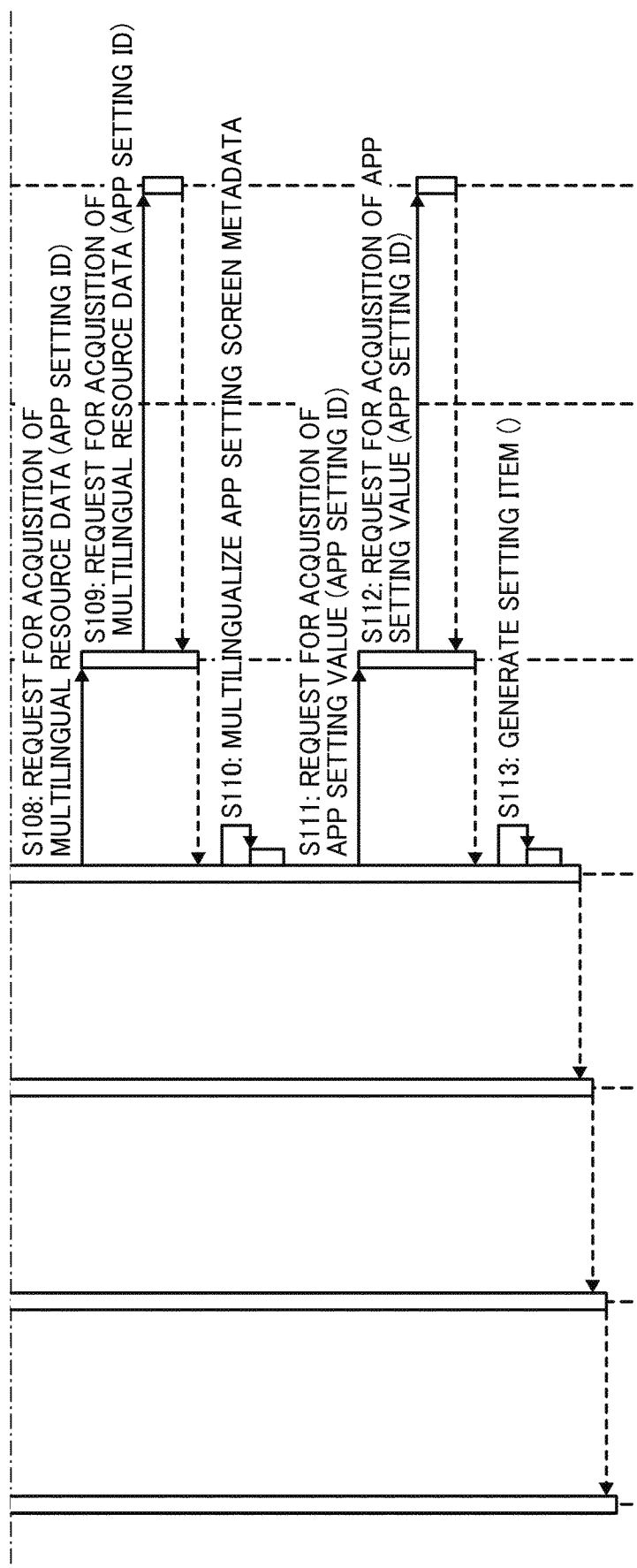

FIGS. 27A and 27B are a sequence diagram illustrating an example operation of setting an application performed in a case in which multilingualization is performed. The sequence diagram of FIGS. 27A and 27B illustrates an operation of displaying an application setting screen, which corresponds to the operation described above referring to S20 to S30 of FIG. 10B.

Operation of S100 to S107 is performed in substantially the similar manner as described above referring to S20 to S27 of FIG. 10B, and the description thereof is omitted. At S108 and S109, the script analyzer 63 requests the application data manager 72 of the Web service provision apparatus 22 to acquire the multilingual resource data. More specifically, the script analyzer 63 requests acquisition of the multilingual resource data by using an application setting value ID of an URL that is set to the key 1002 selected by the developer as a key.

The application data manager 72 acquires application setting value information from the application setting value information storage 74 by using the application setting value ID as a key. Next, the application data manager 72 acquires application information of FIG. 24 from the application information storage 73 by using an application ID contained in the acquired application setting value information as a key. The application data manager 72 acquires the multilingual resource data contained in the acquired application information, and sends the multilingual resource data to the script analyzer 63 of the terminal 32. It should be noted that at S108 and S109, the script analyzer 63 may designate language information of the browser 60 to receive resource data of the designated language.

At S110, the script analyzer 63 replaces the {{ }} part of the application setting screen metadata of FIGS. 26A and 26B according to the multilingual resource data. More specifically, the script analyzer 63 may replace the {{ }} part of the application setting screen metadata of FIGS. 26A and 26B according to the multilingual resource data based on the language information of the browser 60. Operation of S111 to S113 is performed in substantially the similar manner as described above referring to S28 to S30 of FIG. 10B, and the description thereof is omitted.

With the operation as illustrated in the sequence diagram of FIGS. 27A and 27B, the terminal 32 is able to multilingualize the application setting screen metadata based on the language resource data acquired from the Web service provision apparatus 22.

Figure 28A:
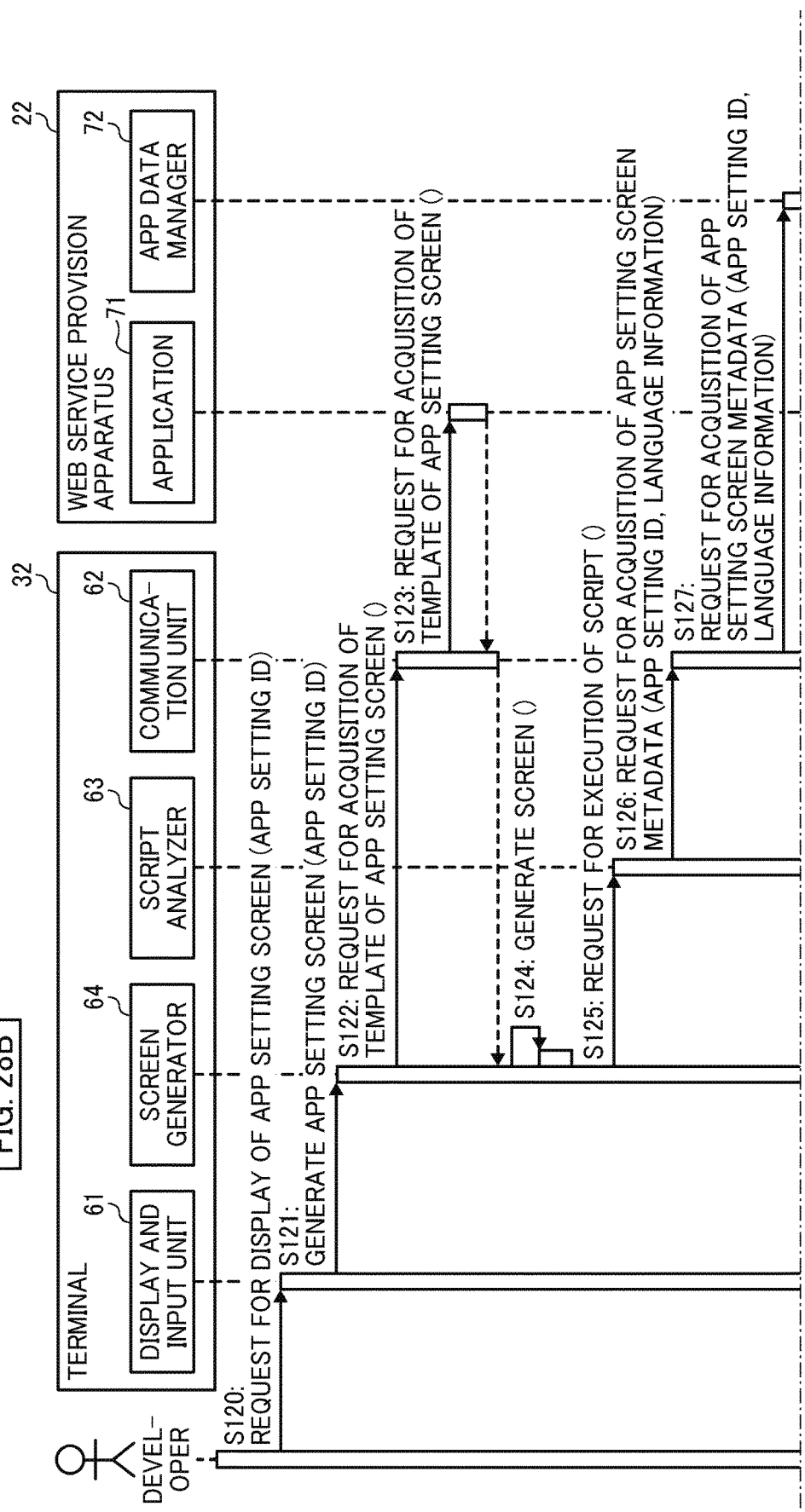

FIGS. 28A and 28B are a sequence diagram illustrating an example operation of setting an application performed in a case in which multilingualization is performed. The sequence diagram of FIGS. 28A and 28B illustrates an operation of displaying an application setting screen, which corresponds to the operation described above referring to S20 to S30 of FIG. 10B.

Operation of S120 to S125 is performed in substantially the similar manner as described above referring to S20 to S25 of FIG. 10B, and the description thereof is omitted. At S126 and S127, the script analyzer 63 requests the application data manager 72 of the Web service provision apparatus 22 for application setting screen metadata. More specifically, the script analyzer 63 requests acquisition of the application setting screen metadata by using the language information of the browser 60 and the application setting value ID of the URL that is set to the key 1002 selected by the developer as a key.

The application data manager 72 acquires application setting value information from the application setting value information storage 74 by using the application setting value ID as a key. Next, the application data manager 72 acquires application information from the application information storage 73 by using an application ID contained in the acquired application setting value information as a key. The application data manager 72 acquires the application setting screen metadata and the multilingual resource data contained in the acquired application information.

At S128, the application data manager 72 acquires language resource data corresponding to the language information of the browser 60 from the acquired multilingual resource data. Subsequently, the application data manager 72 performs multilingualization on the application setting screen metadata. For example, the application data manager 72 replaces the {{ }} part of the application setting screen metadata of FIGS. 26A and 26B according to the multilingual resource data. The application data manager 72 sends the application setting screen metadata on which the multilingualization is performed to the script analyzer 63 of the terminal 32. Operation of S129 to S131 is performed in substantially the similar manner as described above referring to S28 to S30 of FIG. 10B, and the description thereof is omitted.

With the operation as illustrated in the sequence diagram of FIGS. 28A and 28B, the terminal 32 is able to acquire the application setting screen metadata that has been multilingualized at the Web service provision apparatus 22.

Third Embodiment

In the information processing system 1 according to a third embodiment, the generation of application setting screen is performed at the Web service provision apparatus 22. A description of elements, members, components, or operations that are same as those of the first embodiment is omitted below.

FIGS. 29A and 29B are a sequence diagram illustrating another example operation of setting an application. Operation of S201 to S202 is performed in substantially the similar manner as described above referring to S11 to S12 of FIG. 10A, and the description thereof is omitted. At S203 and S204, the screen generator 64 requests the application 71 of the Web service provision apparatus 22 for the application setting list screen via the communication unit 62.

At S205, the application 71 requests the application data manager 72 of the Web service provision apparatus 22 for an application setting value ID list. The application data manager 72 reads out each application setting value ID from the application setting value information as illustrated in FIG. 6 stored in the application setting value information storage 74 to generate the application setting value ID list as illustrated in FIG. 12.

The application 71 acquires the application setting value ID list as illustrated in FIG. 12. At S206, the application 71 generates the application setting list screen 1000 as illustrated in FIG. 13 based on the acquired application setting value ID list. Further, the application 71 sends the generated application setting list screen 1000 to the terminal 32.

Operation of S207 to S208 is performed in substantially the similar manner as described above referring to S20 to S21 of FIG. 10B, and the description thereof is omitted. At S209 and S210, the screen generator 64 requests the application 71 of the Web service provision apparatus 22 for the application setting screen metadata by using the application setting value ID of the URL that is set to the key 1002 selected by the developer as a key.

At S211, the application 71 of the Web service provision apparatus 22 acquires the application setting screen metadata from the application data manager 72 by using the application ID as a key. Further, at S212, the application 71 acquires the application setting value information from the application data manager 72 by using the application setting value ID as a key.

At S213, the application 71 generates a setting item part in the application setting screen based on the application setting screen metadata and the application setting value to fill in the "area displaying a setting item" in the application setting screen template illustrated in FIG. 14. More specifically, at S213, the script analyzer 63 determines an HTML element to be used based on the mapping information as illustrated in FIG. 15.

With the operation described so far, the application 71 generates HTML data for displaying the application setting screen 1100 of FIG. 16 at the terminal 32, and provides the terminal 32 with the HTML data. It should be noted that the operation of multilingualization as described above in the second embodiment may be performed at the Web service provision apparatus 22.

Fourth Embodiment

Figure 30:
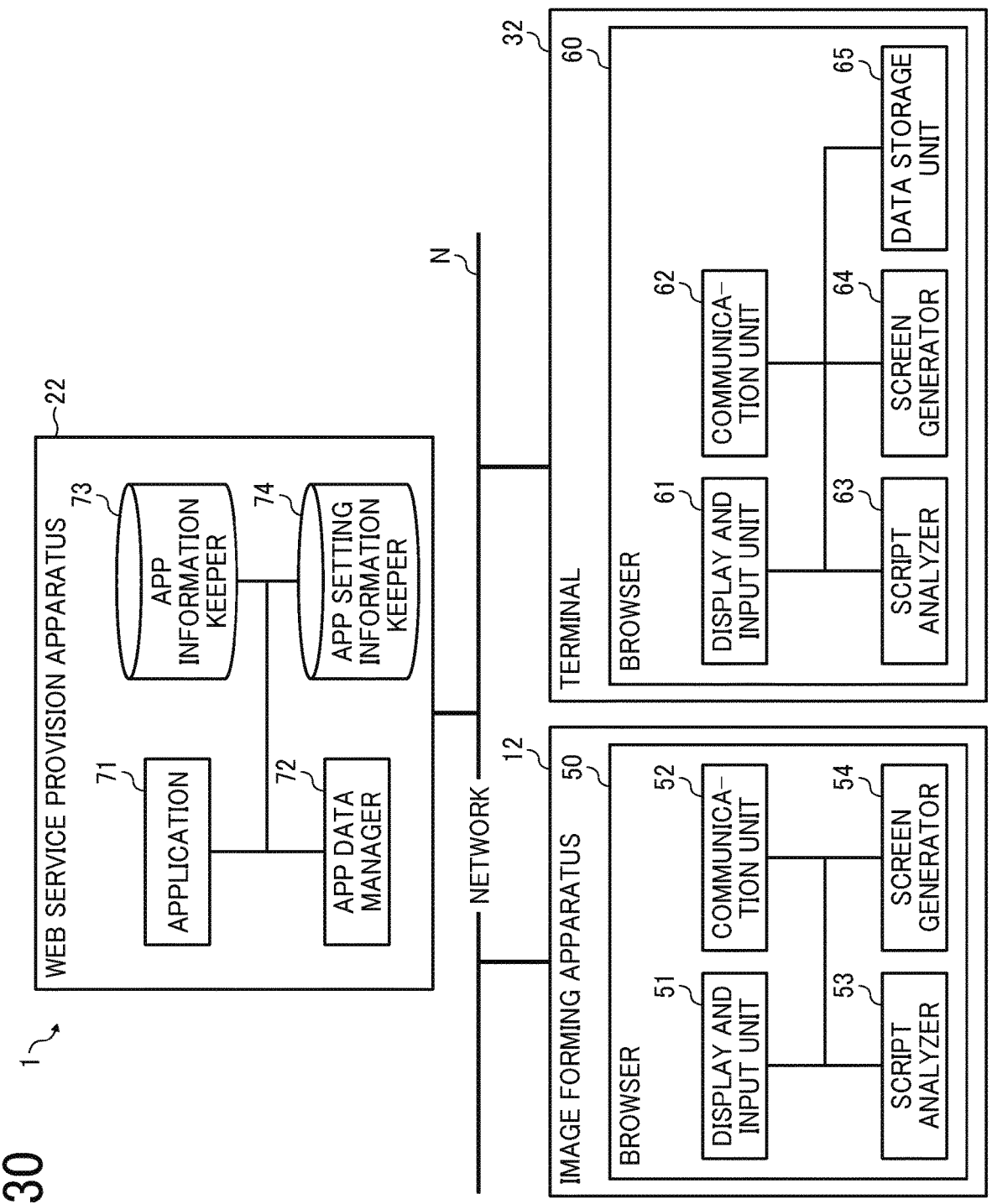
FIG. 30 is a block diagram illustrating an example functional configuration of the information processing system according to another embodiment of the present disclosure.

In the information processing system 1 according to a fourth embodiment, the terminal 32 caches the application setting screen metadata of FIGS. 7A and 7B, for example. FIG. 30 is a block diagram illustrating an example functional configuration of the information processing system 1 according to the fourth embodiment. As illustrated in FIG. 30, the information processing system 1 according to the fourth embodiment includes the terminal 32 that further includes a data storage unit 65 in addition to the functional blocks illustrated in FIG. 4. The terminal 32 of FIG. 30 caches the application setting screen metadata acquired from the Web service provision apparatus 22 in the data storage unit 65. In the information processing system 1 of FIG. 30, the application setting screen metadata that does not change frequently is cached in the terminal 32.

Figure 31B:
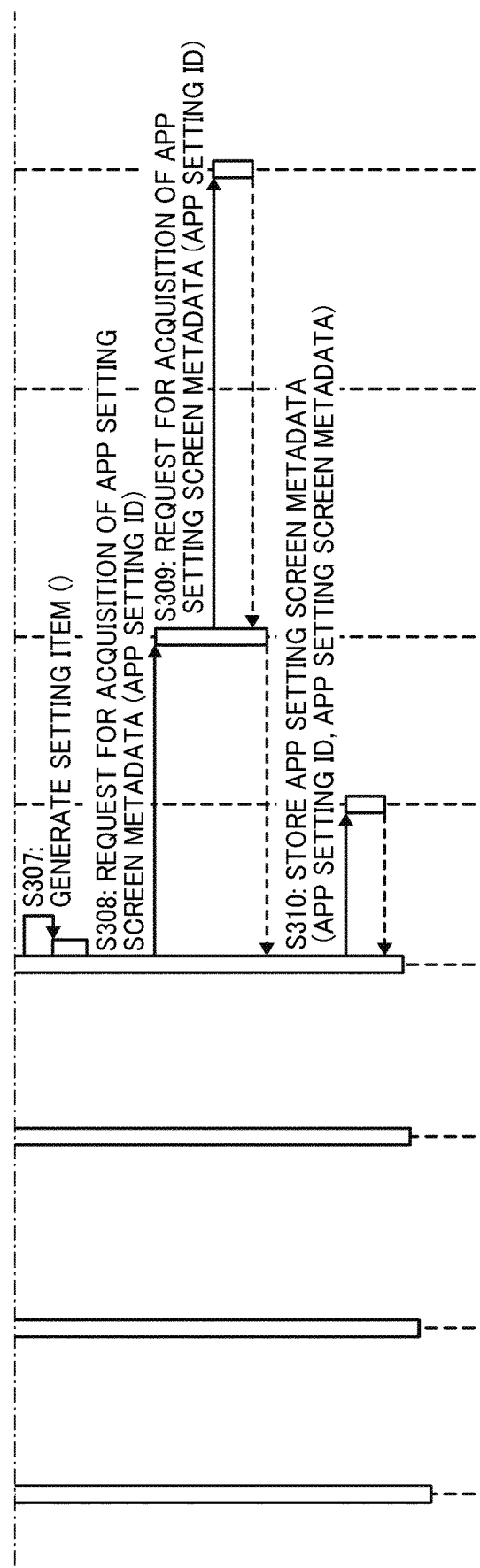

FIGS. 31A and 31B are a sequence diagram illustrating still another example operation of setting an application. Operation of S300 to S305 is performed in substantially the similar manner as described above referring to S20 to S25 of FIG. 10B, and the description thereof is omitted. At S306, the script analyzer 63 tries to acquire the application setting screen metadata from the data storage unit 65. The application setting screen metadata is not initially stored in the data storage unit 65.

In a case in which the application setting screen metadata is not stored in the data storage unit 65, the script analyzer 63 requests the application data manager 72 of the Web service provision apparatus 22 for the application setting screen metadata at S308 and S309. The script analyzer 63 stores the acquired application setting screen metadata in the data storage unit 65. Operation performed subsequent to the storing of application setting screen metadata in the data storage unit 65 is substantially the similar to that of S28 of FIG. 10B and subsequent steps.

In a case in which the application setting screen metadata is stored in the data storage unit 65, the script analyzer 63 acquires the application setting screen metadata from the data storage unit 65 and performs the operation of S28 of FIG. 10B and subsequent steps. As described heretofore, according to the fourth embodiment, the application setting screen metadata acquired from the Web service provision apparatus 22 is stored in the data storage unit 65. The application setting screen metadata stored in the data storage unit 65 is used for the next and subsequent displaying of the application setting screen.

The image forming apparatus 12 is an example of an electronic apparatus described in the appended claims. The Web service provision apparatus 22 is an example of an information processing apparatus. The application screen 1200 is an example an operation screen of a web application. The application setting screen 1100 is an example of a setting screen. The application setting screen metadata is an example of information relating to a setting item of the web application.

The script is an example of program contained in screen data of the setting screen.

As described heretofore, according to several embodiments of the present disclosure, efficiency is improved in developing a web application that operates on an electronic apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information processing system, comprising:
a web service provision apparatus that provides an electronic apparatus with a web service by way of web applications, the system including:
a memory included in the web service configured to:
store information relating to a setting item of a plurality of the web applications, and
store a setting value to be set to the setting item, the setting value is displayed on an operation screen of a web application that is displayed at the electronic apparatus;
circuitry of the web service provision apparatus configured to:
transmit to a terminal apparatus, the information relating to the setting item and the setting value, the information and the setting value for displaying on a setting screen that is displayed at the terminal apparatus, the setting value being displayed on the operation screen of the web application specified according to a user operation on the electronic apparatus that is displayed at the electronic apparatus, the setting screen being a screen according to the web application specified according to a screen request from the terminal apparatus, the setting screen being different for each application;
receive a request to update the setting value stored in the memory included in the web service, the request being transmitted from the terminal apparatus based on an instruction of the setting value, the instruction being accepted through the setting screen displayed at the terminal apparatus, the setting value being displayed on the operation screen of the web application that is displayed at the electronic apparatus; and
circuitry of the electronic apparatus configured to:
display the operation screen of the web application specified according to the user operation based on the setting value to be set to the setting item, the setting value which has been updated in response to the request from the terminal apparatus; and
receive a user operation relating to the setting value, via the operation screen.

2. The information processing system of claim 1, wherein the terminal apparatus executes a program contained in screen data of the setting screen on a browser to:
acquire the information relating to the setting item from the memory;

acquire the setting value to be set to the setting item from the memory; and implement the circuitry to generate the setting screen and to update the stored setting value.

3. The information processing system of claim 1, wherein the memory is further configured to store, as the information relating to the setting item of the web application, a setting item and a type of the setting item of the settings relating to the operation screen indicated by the instruction accepted through the setting screen, in association with each of a plurality of web applications.

4. The information processing system of claim 1, wherein the circuitry is further configured to:

generate screen data of a setting item part that constitutes a part of the setting screen based on the information relating to the setting item of the web application and the setting value; and embed the generated screen data of the setting item part in screen data of a template of the setting screen to generate screen data of the setting screen.

5. The information processing system of claim 1, wherein the memory is further configured to store the information relating to the setting item of the web application corresponding to multiple languages, and the circuitry is further configured to generate the setting screen based on language information of the terminal apparatus.

6. The information processing system of claim 1, wherein the circuitry is further configured to:

store screen data of the displayed setting screen;

in a case in which the screen data of the setting screen has been stored, to use the stored screen data of the setting screen to generate the setting screen; and in a case in which the screen data of the setting screen has not been stored, to generate the setting screen based on the information relating to the setting item of the web application and the setting value.

7. The information processing system of claim 2, wherein the terminal apparatus executes the program contained in the screen data of the setting screen on the browser to:

check appropriateness of the settings relating to the operation screen of the web application indicated by the instruction accepted through the setting screen; and notify a result of the check, wherein the appropriateness is determined based on whether the setting value to be set to the setting item indicated by the instruction accepted through the setting screen is appropriate.

8. The information processing system of claim 7, wherein the appropriateness is determined based on any one of a presence of input of the setting value to be set to the setting item, a type of the setting value, a size of the setting value, and a length of the setting value.

9. The information processing system of claim 7, wherein appropriateness of the setting value to be set to one of a plurality of setting items is determined depending on the setting value to be set to another one of the plurality of setting items.

10. The information processing system of claim 7, wherein the appropriateness of the setting value to be set to the setting item is determined depending on language information of the terminal apparatus.

11. A web service provision apparatus that provides an electronic apparatus with a web service by way of web applications, comprising:

a memory included in the web service provision apparatus configured to store:

information relating to a setting item of a plurality of the web applications; and a setting value to be set to the setting item, the setting value is displayed on an operation screen of the web application that is displayed at the electronic apparatus, circuitry of the web service provision apparatus configured to:

transmit to a terminal apparatus, the information relating to the setting item and the setting value, the information and the setting value for displaying on a setting screen that is displayed at the terminal apparatus, the setting value being displayed on the operation screen of the web application specified according to a user operation on the electronic apparatus that is displayed at the electronic apparatus, the setting screen being a screen according to the web application specified according to a screen request from the terminal apparatus, the setting screen being different for each application;

receive a request to update the setting value stored in the memory included in the web service, the request being transmitted from the terminal apparatus based on an instruction of the setting value, the instruction being accepted through the setting screen displayed at the terminal apparatus, the setting value being displayed on the operation screen of the web application that is displayed at the electronic apparatus, and circuitry of the electronic apparatus configured to:

display the operation screen of the web application specified according to the user operation based on the setting value to be set to the setting item, the setting value which has been updated in response to the request from the terminal apparatus; and receive a user operation relating to the setting value, via the operation screen.

12. The web service provision apparatus of claim 11, wherein the memory stores, as the information relating to the setting item of the web application, a setting item and a type of the setting item of the settings relating to the operation screen in association with each of a plurality of web applications.

13. The web service provision apparatus of claim 11, wherein the memory stores the information relating to the setting item of the web application corresponding to multiple languages, and the circuitry is further configured to generate the setting screen based on language information of the terminal apparatus.

14. A method of generating a screen performed by a web service provision apparatus that provides electronic apparatus with a web service by way of one or more web applications, the method comprising:

storing, in a memory included in the web service provision apparatus, information relating to a setting item of a plurality of the web applications; and storing, in the memory, a setting value to be set to the setting item, the setting value is displayed on an operation screen of the web application that is displayed at the electronic apparatus;

transmitting to a terminal apparatus, the information relating to the setting item and the setting value, the information and the setting value for displaying on a setting screen that is displayed at the terminal apparatus, the setting value being displayed on the operation screen of the web application specified according to a user operation on the electronic apparatus that is displayed at the electronic apparatus, the setting screen being a screen according to the web application specified according to a screen request from the terminal apparatus, the setting screen being different for each application;

receiving a request to update the setting value stored in the memory included in the web service, the request being transmitted from the terminal apparatus based on an instruction of the setting value, the instruction being accepted through the setting screen displayed at the terminal apparatus, the setting value being displayed on the operation screen of the web application that is displayed at the electronic apparatus;

displaying the operation screen of the web application specified according to the user operation based on the setting value to be set to the setting item, the setting value which has been updated in response to the request from the terminal apparatus; and receiving a user operation relating to the setting value, via the operation screen.

15. The information processing system of claim 1, further comprising a plurality of sets of setting values associated with each web application.

16. The information processing system of claim 1, wherein different setting screens are generated for respective applications based on application setting screen metadata for the respective web applications.

17. The web service provision apparatus of claim 11, further comprising a plurality of sets of setting values associated with each web application.

18. The web service provision apparatus of claim 11, wherein different setting screens are generated for respective applications based on application setting screen metadata for the respective web applications.

19. The method of generating a screen of claim 14, wherein the stored setting value includes a plurality of sets of setting values associated with each web application.

20. The method of generating a screen of claim 14, wherein different setting screens are generated for respective applications based on application setting screen metadata for the respective web applications.

* * * * *